(12) United States Patent
Yu et al.

(10) Patent No.: US 11,888,523 B2
(45) Date of Patent: Jan. 30, 2024

(54) USB AND THUNDERBOLT OPTICAL SIGNAL TRANSCEIVER

(71) Applicant: WINGCOMM Co. Ltd., Nantong (CN)

(72) Inventors: Jianming Yu, Nantong (CN); Zuodong Wang, Beijing (CN); Wei Mao, Palo Alto, CA (US); Yun Bai, Beijing (CN)

(73) Assignee: WINGCOMM CO. LTD., Nantong (CN)

( * ) Notice: Subject to any disclaimer, the term of this patent is extended or adjusted under 35 U.S.C. 154(b) by 231 days.

(21) Appl. No.: 17/546,934

(22) Filed: Dec. 9, 2021

(65) Prior Publication Data

US 2022/0311515 A1    Sep. 29, 2022

(30) Foreign Application Priority Data

Mar. 23, 2021 (CN) .......................... 202110307189.9

(51) Int. Cl.
| | | |
|---|---|---|
| *H04B 10/25* | (2013.01) | |
| *H04B 10/077* | (2013.01) | |
| *H04B 10/40* | (2013.01) | |
| *H04B 10/60* | (2013.01) | |
| *G02B 6/42* | (2006.01) | |
| *G06F 13/38* | (2006.01) | |
| *H01B 11/22* | (2006.01) | |
| *H04B 10/80* | (2013.01) | |

(52) U.S. Cl.
CPC ......... *H04B 10/2589* (2020.05); *G02B 6/428* (2013.01); *G06F 13/382* (2013.01); *H01B 11/22* (2013.01); *H04B 10/0775* (2013.01); *H04B 10/40* (2013.01); *H04B 10/60* (2013.01); *H04B 10/801* (2013.01); *G06F 2213/3812* (2013.01); *G06F 2213/3852* (2013.01)

(58) Field of Classification Search
CPC ............ H04B 10/2589; H04B 10/0775; H04B 10/40; H04B 10/60
See application file for complete search history.

(56) References Cited

U.S. PATENT DOCUMENTS

| | | | |
|---|---|---|---|
| 2015/0043922 A1* | 2/2015 | Ying ...................... | H04B 10/40 398/115 |
| 2017/0017604 A1* | 1/2017 | Chen .................... | G06F 11/3027 |
| 2023/0281151 A1* | 9/2023 | Fujita ................... | H04B 10/075 710/105 |

* cited by examiner

*Primary Examiner* — Pranesh K Barua
(74) *Attorney, Agent, or Firm* — David R. Stevens; Stevens Law Group

(57) ABSTRACT

Systems and methods to implement a USB and Thunderbolt optical signal transceiver are described. One method includes detecting presence of a USB sideband signal received over an optical communication channel and associated with a USB communication request. Responsive to the detecting, the method may determine that the USB communication request corresponds to a USB communication mode and perform a sideband negotiation. The USB communication mode may be enabled. A specified number of channels associated with the USB communication request may be determined. USB communication may be performed using the specified number of channels over the optical communication channel in the USB communication mode.

20 Claims, 17 Drawing Sheets

USB AND THUNDERBOLT OPTICAL SIGNAL TRANSCEIVER

CROSS-REFERENCE TO RELATED APPLICATION

This application claims the benefit of Chinese Application Serial No. 202110307189.9, filed Mar. 23, 2021, which is hereby incorporated herein by reference in its entirety.

BACKGROUND

Technical Field

The present disclosure relates to systems and methods that facilitate transferring USB and Thunderbolt signals over optical communication links.

Background Art

With the continuous development of computer technology, computer peripheral interface technology has entered the era of the universal serial bus (USB). Over its history, the USB interface unified the computer interface standard, from the era of PS/2, serial ports and parallel ports. USB, with its characteristics of plug and play and high transmission speed, has quickly become a mainstream device interface favored by device manufacturers and users. The development of USB technology has progressed in stages, including USB1.0, USB2.0, USB3.0, USB3.1 Gen, USB3.2 and USB4. Correspondingly, the data transfer rate of the USB protocol data transfer rates have increased from 1.5 Mbps, 12 Mbps, 480 Mbps, 5 Gbps and 10 Gbps to 20 Gbps and 40 Gbps. In the era of USB1.0 and USB2.0, the USB protocol mainly used D+ and D-signals for half-duplex communication, with data transfer rates up to 480 Mbps. After the USB3.0 era, high-speed full-duplex communication channels SuperSpeed Transmit (SSTX+/−) and Super-Speed Receive (SSRX+/−) were introduced into USB, increasing data transfer rates to up to 5 Gbps. USB3.1 and USB3.2 further increased the data transfer rate to up to 10 Gbps per channel. USB4 adopts the same physical interface as the Thunderbolt protocol, which brings the single-channel data transfer rate up to 20 Gbps. In addition, USB3.2 and USB4 include a dual-channel form of the USB interface. In other words, these protocols implemented USB3.2 Gen1×2, USB3.2 Gen2×2, USB4 Gen2×2 and USB4 Gen3×2. These implementations essentially doubled the USB data transfer rate by improving communication parallelism.

The Thunderbolt interface and protocol is a higher-speed IO standard. The Thunderbolt interface and protocol was designed to unify connections between computers and other devices. The development of Thunderbolt has also progressed in stages, including Thunderbolt, Thunderbolt 2, Thunderbolt 3 and Thunderbolt 4. Correspondingly, Thunderbolt protocol data transfer rates have increased from 10 Gbps to 20 Gbps to 40 Gbps. Starting with Thunderbolt 3, Thunderbolt cable form factor was changed from a mini DisplayPort to USB type C. The Thunderbolt cable form factor change significantly increased compatibility and unification with the USB protocol.

From an implementation perspective, USB4 physical layer protocols and Thunderbolt 3 physical layer protocols are very similar. As single channel data transfer rates for both the USB protocol and the Thunderbolt protocol continue to increase, various shortcomings of the commonly-used copper wire communication medium have been exposed. In general, when using copper wire, maintaining desired bit error rates and higher quality data transfer becomes more difficult as data transfer rates increase. For example, it can be difficult to maintain a 1e-12 bit error rate requirement of a physical layer protocol when data transfer rates reach 20 Gbps and above. Additionally, it can be difficult maintain long-distance, high-quality data transmission when data transfer rates reach 5 Gbps and above.

A number of optical fiber techniques have attempted to address the shortfalls associated with implementing USB protocol data transfer and Thunderbolt protocol data transfer over copper wire:

At least one technique uses an optical module (e.g., an integrated circuit) to convert and transfer USB signals. Unfortunately, the data transfer protocols utilized by the optical module generally define a specific data transfer rate, for example, 10.3125 Gbps, 24.33 Gbps, 25.78125 Gbps and 28.05 Gbps. An optical module with a data transfer rate at or above 20 Gbps generally uses a clock data recovery circuit. However, 20 Gbps or higher rates are typically not within the working range of the optical module clock recovery circuit. In addition, an optical module has a low integration level in terms of device footprint. Manufacturing active optical cables compatible with the USB and Thunderbolt protocols is usually associated with a large volume manufacturing capability and a high power consumption when manufacturing if an optical module is used.

At least one other technique, realizes photoelectric conversion of signals using a special transceiver chip within an optical module. The transceiver chip can be configured using an associated microcontroller. In this scheme, the optical module manufacturing is integrated into USB active optical cable. The disadvantage is that the design of the customized integrated circuit (chip) for the optical module is generally combined with single-channel reception and single channel transmission, or four-channels reception and four-channels transmission. There is no ability to switch between the two modes. When using this chip to realize the signal transmission of dual-channel USB protocol and Thunderbolt protocol, it is difficult to perform a patch and couple process during manufacturing. This makes the process complex and difficult to realize. In addition, in this scheme, sideband signals and channel configuration signals need to be transmitted by extra copper wires.

SUMMARY

Aspects of the invention are directed to systems and methods for transferring USB and Thunderbolt signals over optical communication links.

One aspect includes detecting presence of a Universal Serial Bus (USB) sideband signal received over an optical communication channel and associated with a USB communication request. Responsive to the detecting, it is determined that the USB communication request corresponds to a USB communication mode. A sideband negotiation is performed. The USB communication mode is enabled and a specified number of channels associated with the USB communication request is determined. USB communication using the specified number of channels is performed over the optical communication channel in the USB communication mode.

Another aspect includes checking for but failing to detect a presence of a USB sideband signal received over an optical communication channel. This other aspect also includes detecting presence of a low-frequency periodic signaling (LFPS) signal received over the optical communication channel and associated with a USB communication request. Responsive to detecting, it is determined that the USB communication request corresponds to a USB communication mode. Further responsive to the detecting, an LFPS test is performed. The USB communication mode is enabled and a specified number of channels associated with the USB communication request are determined. USB communication using the specified number of channels is performed over the optical communication channel in the USB communication mode.

Aspects include apparatus with electro-optical interfaces that implement the described methods.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
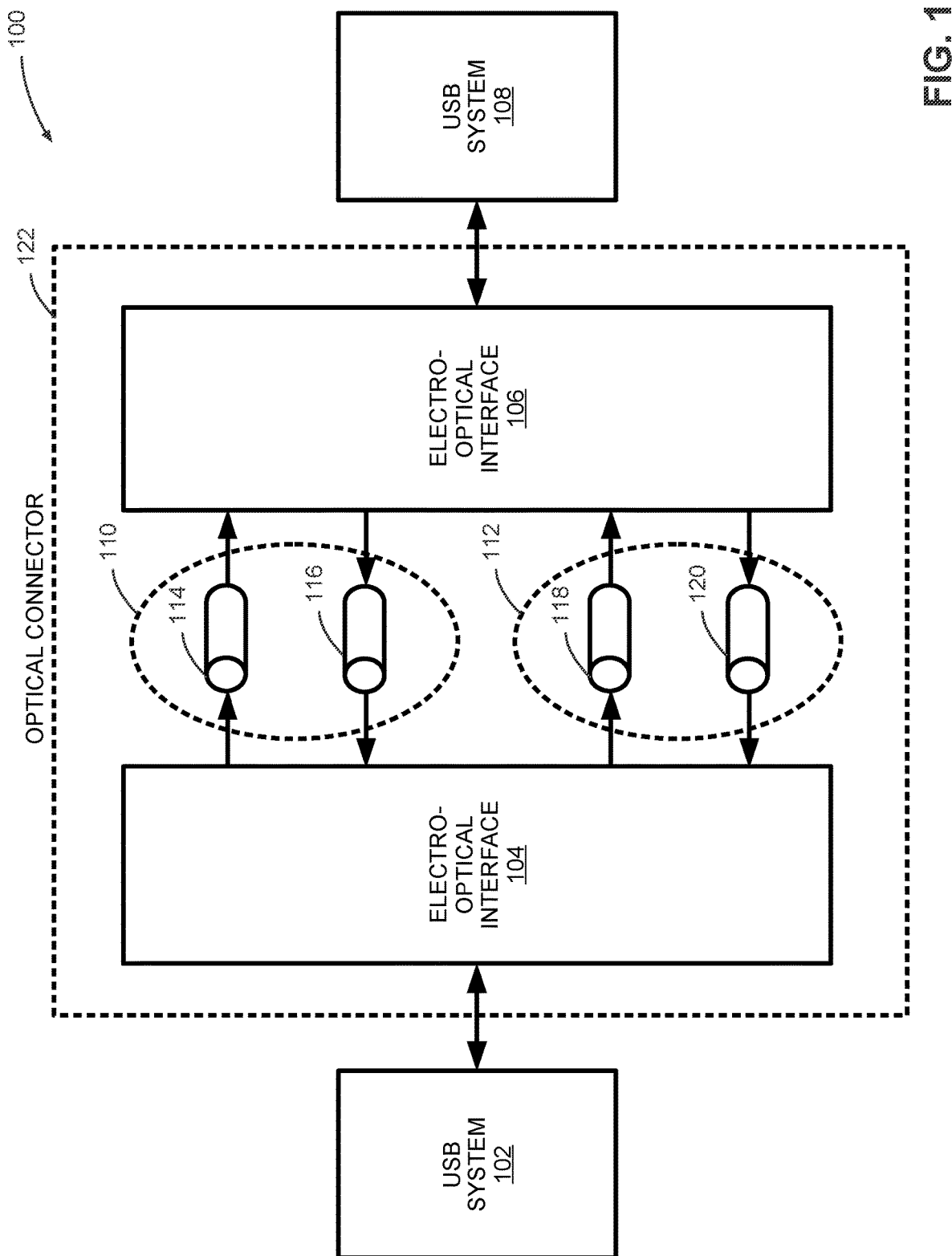
FIG. 1 is a block diagram depicting an embodiment of a USB optical connection interface.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein address various limitations associated with other communication techniques. Some embodiments adaptive facilitating compatible transfer of Universal Serial Bus (USB) protocol signals and/or Thunderbolt protocol signals via an optical fiber transmission system. Some embodiments include an appropriate mechanical coupling at each distal end of the optical fiber transmission system (also referred to as an A-terminal interface and a B-terminal interface). The optical fiber transmission system may utilize a combination of average optical power modulation and adaptive amplitude modulation order switching. The combination can facilitate realization of USB protocol signals and/or Thunderbolt protocol signals with small optical path overhead, and simultaneous transmission of sideband and channel configuration (CC) signals.

The A-terminal interface and the B-terminal interface may be configured with monitoring units. Through the monitoring units, LFPS signals can be monitored to obtain channel configuration signals or sideband signals, and a single-channel mode or a dual-channel mode adaptively selected.

In one aspect, the mode adaptive optical fiber transmission system is compatible with a USB protocol and/or a Thunderbolt protocol at a physical layer. As such, data format conversion between the USB protocol and the Thunderbolt protocol at a protocol layer is optional, and possibly not needed. The mode adaptive optical fiber transmission system may be compatible with USB3.0, USB3.1 Gen1, USB3.1 Gen2, USB3.2 Gen1×2, USB3.2 Gen2, USB3.2 Gen2×2, USB4.0 and subsequent related USB protocols, Thunderbolt3, Thunderbolt4 and subsequent related Thunderbolt protocols.

Aspects include implementing at least two groups of bidirectional optical paths for signal transmission, with the physical layer being adaptively compatible with single-channel and dual-channel USB protocol working modes and Thunderbolt protocol working modes. In another more specific aspect, signal transmission is implemented using a single group of bidirectional optical paths. The physical layer may be adaptively compatible with the single-channel and dual-channel USB protocol working modes and Thunderbolt protocol working modes. In one aspect, the A-terminal interface and the B-terminal interface of an active optical cable of the system are symmetrical, and the optical cable has no directionality.

FIG. 1 is a block diagram depicting an embodiment of a USB optical connection interface 100. As depicted, USB optical connection interface 100 includes USB system 102, optical connector 122, and USB system 108. Optical connector 122 further includes electro-optical interface 104 and electro-optical interface 106. Electro-optical interface 104 can optically connect to electro-optical interface 106 via a bidirectional optical communication channel 110 and a bidirectional optical communication channel 112. As depicted, bidirectional optical communication channel 110 includes unidirectional optical communication channel 114 and unidirectional optical communication channel 116. Likewise, bidirectional optical communication channel 112 includes unidirectional optical communication channel 118 and unidirectional optical communication channel 120. In one aspect, optical connector 122 may be referred to as a "mode adaptive optical fiber transmission system." USB system 102 may be referred to as an "A-terminal" and USB system 108 may be referred to as a "B-terminal." Each of unidirectional optical communication channel 114, 116, 118 and 120 may be implemented using one or more optical fibers.

In one aspect, each of USB system 102 and USB system 108 may be at and/or included within computing system that supports USB or Thunderbolt communication. In this description and the following claims, a "computing system" is defined as a device that includes a processor, memory, and a communication interface. Each of USB system 102 and USB system 108 may be a USB device such as a USB camera, a USB hard drive, a USB dongle, or any other device that supports USB connectivity.

In one aspect, electro-optical interface 104 is configured to receive a first set of one or more USB or Thunderbolt electrical signals from USB system 102. Electro-optical interface 104 may convert these USB or Thunderbolt electrical signals to a corresponding set of USB or Thunderbolt optical signals. Electro-optical interface 104 may transmit these USB or Thunderbolt optical signals via any combination of unidirectional optical communication channel 114 and/or unidirectional optical communication channel 118 to electro-optical interface 106. Electro optical interface 106 may receive these USB or Thunderbolt optical signals and convert these USB or Thunderbolt optical signals into a corresponding second set of USB or Thunderbolt electrical signals. This second set of USB or Thunderbolt electrical signals may be substantially identical to the first set of USB or Thunderbolt electrical signals received by electro-optical interface 104 from USB system 102. Electro-optical interface 106 may then transmit the second set of USB or Thunderbolt electrical signals to USB system 106.

In one aspect, electro-optical interface 106 is configured to receive a third set of one or more USB or Thunderbolt electrical signals from USB system 108. Electro-optical interface 106 may convert these USB or Thunderbolt electrical signals to a corresponding set of USB or Thunderbolt optical signals. Electro-optical interface 106 may transmit these USB or Thunderbolt optical signals via any combination of unidirectional optical communication channel 116 and unidirectional optical communication channel 120 to electro-optical interface 104. Electro optical interface 104 may receive these USB or Thunderbolt optical signals and convert these USB or Thunderbolt optical signals into a corresponding fourth set of USB or Thunderbolt electrical signals. This fourth set of USB or Thunderbolt electrical signals may be substantially identical to the third set of USB or Thunderbolt electrical signals received by electro-optical interface 106 from USB system 108. Electro-optical interface 104 may then transmit the second set of USB or Thunderbolt electrical signals to USB system 102.

Figure 2:
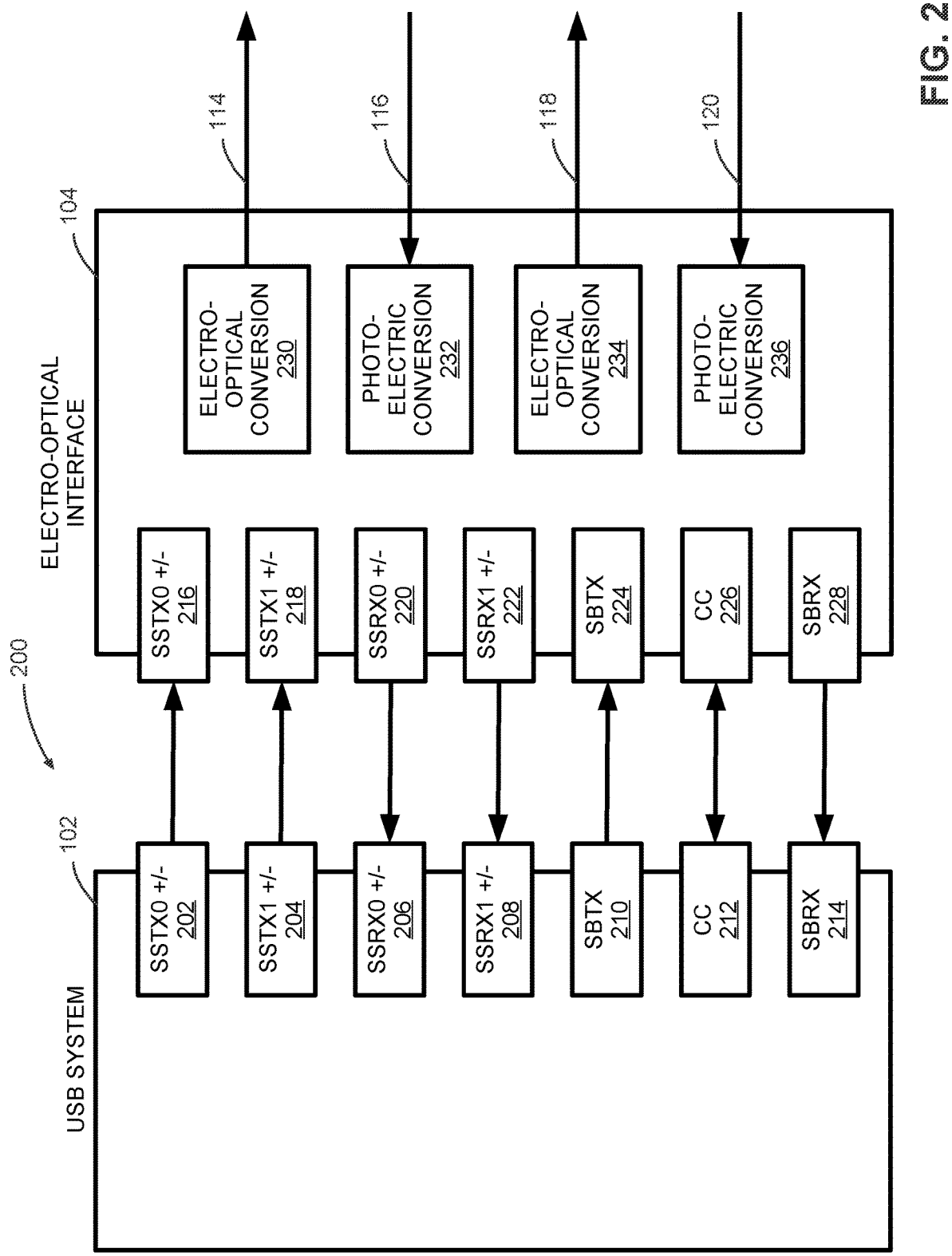
FIG. 2 is a block diagram depicting an embodiment of an interface between a USB system and an electro-optical interface.

In the following description, the following abbreviations are defined:
SSTX: USB SuperSpeed Transmit
SSRX: USB SuperSpeed Receive
SBTX: USB Sideband Transmit
SBRX: USB Sideband Receive
CC: USB Configuration Channel
LFPS: USB Low-Frequency Periodic Signaling FIG. 2 is a block diagram depicting an embodiment of an interface 200 between USB system 102 and electro-optical interface 104. As depicted, USB system 102 includes SSTX0+/− terminal 202, SSTX1+/− terminal 204, SSRX0+/− terminal 206, SSRX1+/− terminal 208, SBTX terminal 210, CC terminal 212, and SBRX terminal 214. Electro-optical interface 104 includes SSTX0+/− terminal 216, SSTX1+/− terminal 218, SSRX0+/− terminal 220, SSRX1+/− terminal 222, SBTX terminal 224, CC terminal 226, and SBRX terminal 228. Electro-optical interface 104 also includes electro-optical conversion 230, photoelectric conversion 232, electro-optical conversion 234, and photoelectric conversion 236.

In one aspect, SSTX0+/− terminal 202 through SBRX terminal and SSTX0+/− terminal 216 through SBRX terminal 228 facilitate transmitting and receiving USB protocol signals and/or Thunderbolt protocol signals. SSTX0+/− terminal 202 may transmit an SSTX0+/− differential USB electrical signal to SSTX0+/− terminal 216. SSTX1+/− terminal 204 may transmit an SSTX1+/− differential USB electrical signal to SSTX1+/− terminal 218. SSRX0+/− terminal 206 may receive an SSRX0+/− differential USB electrical signal from SSRX0+/− terminal 220. SSRX1+/− terminal 208 may receive an SSRX1+/− differential USB electrical signal from SSRX1+/− terminal 222. SBTX terminal 210 may transmit an SBTX USB sideband electrical signal to SBTX terminal 224. SBRX terminal 214 may receive an SBRX USB sideband electrical signal from SBRX terminal 228. CC terminal 212 and CC terminal 226 may bidirectionally communicate USB CC data.

In one aspect, the SSTX0+/− differential USB electrical signal, the SSTX1+/− differential USB electrical signal, the SBTX USB electrical signal, and one or more CC electrical signals may be respectively converted into an SSTX0+/− differential USB optical signal, an SSTX1+/− differential USB optical signal, an SBTX USB optical signal, and one or more CC optical signals by any combination of electro-optical conversion 230 and electro-optical conversion 234. In one aspect, each of electro-optical conversion 230 and 234 is configured to convert one or more electrical signals into a corresponding set of optical signals. Each of electro-optical conversion 230 and 234 can include one or more (e.g., arrays of) laser diodes such as vertical-cavity surface-emitting lasers (VCSELs).

In one aspect, electro-optical conversion 230 outputs one or more output signals converted from electrical signals via unidirectional optical communication channel 114. These output signals may be transmitted via unidirectional optical communication channel 114 to electro-optical interface 106. Electro-optical conversion 234 may output one or more output signals converted from electrical signals via unidirectional optical communication channel 118. These output signals may be transmitted via unidirectional optical communication channel 118 to electro-optical interface 106.

In one aspect, each of photoelectric conversion 232 and photoelectric conversion 236 receives one or more optical signals from electro-optical interface 106 over unidirectional optical communication channel 116 and unidirectional optical communication channel 120, respectively. These optical signals may be any combination of an SSRX0+/− optical signal, an SSRX1+/− optical signal, an SBRX optical signal, and one or more CC optical signals. Each of photoelectric conversion 232 and photoelectric conversion 236 may be comprised of one or more (e.g., arrays of) photodiodes or photodetectors.

Each of photoelectric conversion 232 and photoelectric conversion 236 may convert the received optical signals to any combination of an SSRX0+/−USB differential electrical signal, an SSRX1+/−USB differential electrical signal, an SSRX USB electrical signal, and one or more CC electrical signals. These electrical signals correspond to their optical counterparts. These signals are transmitted from electro-optical interface 104 to USB system 102 via the appropriate terminals. In one aspect, the SSRX0+/−USB differential electrical signal is transmitted from SSRX0+/− terminal 220 to SSRX0+/− terminal 206; the SSRX1+/−USB differential electrical signal is transmitted from SSRX1+/− terminal 222 to SSRX1+/− terminal 208; the SBRX USB electrical signal is transmitted from SBRX terminal 228 to SBRX terminal 214, and CC terminal 212 and CC terminal 226 bidirectionally communicate USB CC electrical signals.

Figure 3:
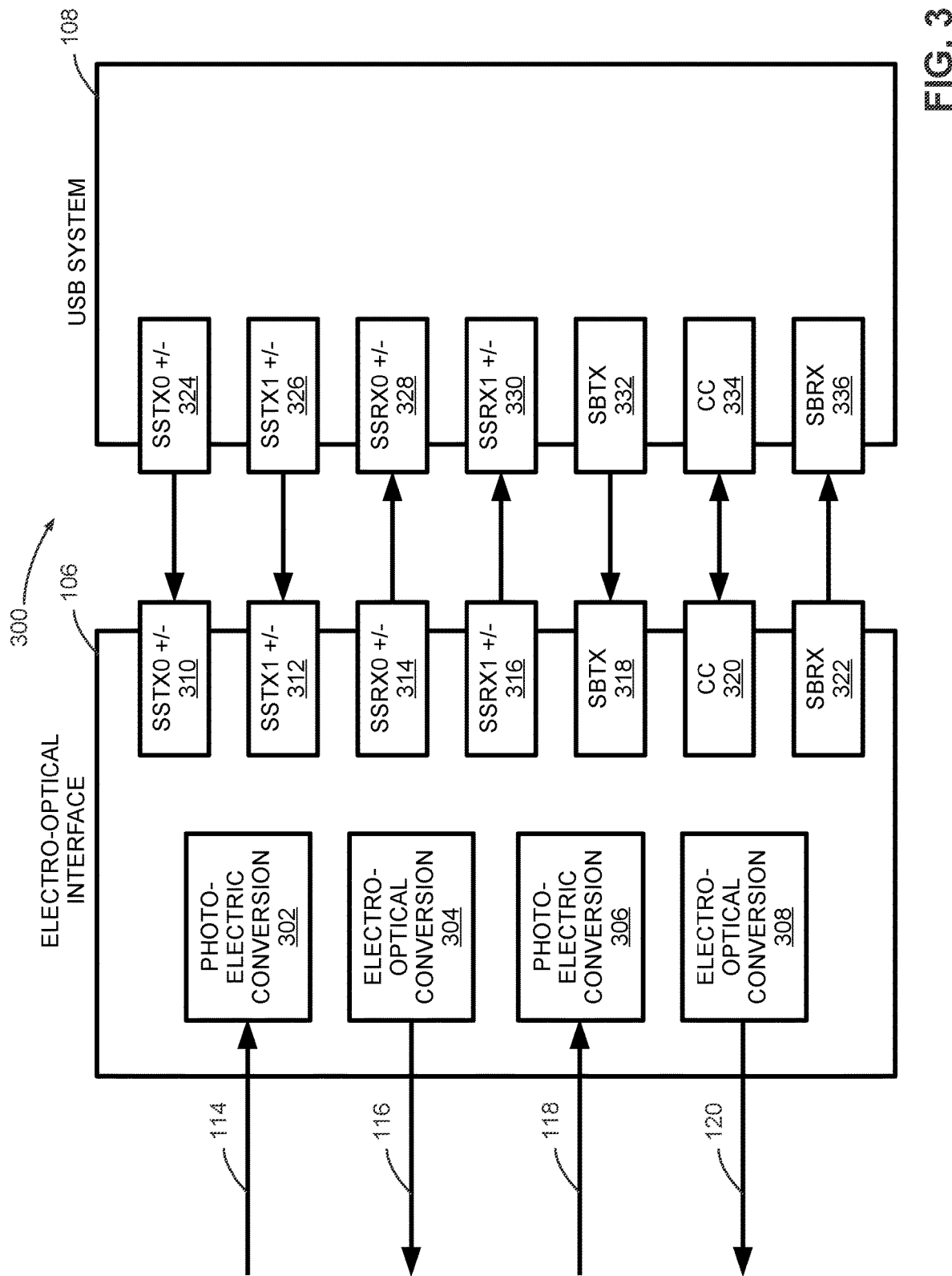
FIG. 3 is a block diagram depicting an embodiment of an interface between a USB system and an electro-optical interface.

FIG. 3 is a block diagram depicting an embodiment of an interface 300 between USB system 108 and electro-optical interface 106. As depicted, USB system 108 includes SSTX0+/− terminal 324, SSTX1+/− terminal 326, SSRX0+/− terminal 328, SSRX1+/− terminal 330, SBTX terminal 332, CC terminal 334, and SBRX terminal 336. Electro-optical interface 106 includes SSTX0+/− terminal 310, SSTX1+/− terminal 312, SSRX0+/− terminal 314, SSRX1+/− terminal 316, SBTX terminal 318, CC terminal 320, and SBRX terminal 322. Electro-optical interface 106 also includes an electro-optical conversion 304, a photoelectric conversion 302, an electro-optical conversion 308, and a photoelectric conversion 306.

In one aspect, SSTX0+/− terminal 324 through SBRX terminal 336 on USB system and SSTX0+/− terminal 310 through SBRX terminal 322 on electro-optical interface 106 are associated with transmitting and receiving the associated USB protocol or Thunderbolt protocol signals. SSTX0+/− terminal 324 may transmit an SSTX0+/− differential USB electrical signal to SSTX0+/− terminal 310. SSTX1+/− terminal 326 may transmit an SSTX1+/− differential USB electrical signal to SSTX1+/− terminal 312. SSRX0+/− terminal 328 may receive an SSRX0+/− differential USB electrical signal from SSRX0+/− terminal 314. SSRX1+/− terminal 330 may receive an SSRX1+/− differential USB electrical signal from SSRX1+/− terminal 316. SBTX terminal 332 may transmit an SBTX USB sideband electrical signal to SBTX terminal 318. SBRX terminal 336 may receive an SBRX USB sideband electrical signal from SBRX terminal 322. CC terminal 334 and CC terminal 320*a* may bidirectionally communicate USB CC data.

In one aspect, the SSTX0+/− differential USB electrical signal, the SSTX1+/− differential USB electrical signal, the SBTX USB electrical signal, and one or more CC electrical signals may be respectively converted into an SSTX0+/− differential USB optical signal, an SSTX1+/− differential USB optical signal, an SBTX USB optical signal, and one or more CC optical signals by any combination of electro-optical conversion 304 and electro-optical conversion 308. In one aspect, each of electro-optical conversion 304 and 308 is configured to convert one or more electrical signals into a corresponding set of optical signals. In one embodiment, each of electro-optical conversion 304 and 308 is comprised of one or more (e.g., arrays of) laser diodes such as vertical-cavity surface-emitting lasers (VCSELs).

In one aspect, electro-optical conversion 304 outputs one or more output signals converted from electrical signals via unidirectional optical communication channel 116. These output signals may be transmitted via unidirectional optical communication channel 116 to electro-optical interface 104. Electro-optical conversion 308 may output one or more output signals converted from electrical signals via unidirectional optical communication channel 120. These output signals may be transmitted via unidirectional optical communication channel 120 to electro-optical interface 104.

In one aspect, each of photoelectric conversion 302 and photoelectric conversion 306 receives one or more optical signals from electro-optical interface 104 over unidirectional optical communication channel 114 and unidirectional optical communication channel 118, respectively. These optical signals may be any combination of an SSRX0+/− optical signal, an SSRX1+/− optical signal, an SBRX optical signal, and one or more CC optical signals. Each of photoelectric conversion 302 and photoelectric conversion 306 may be comprised of one or more (e.g., arrays of) photodiodes or photodetectors.

Each of photoelectric conversion 302 and photoelectric conversion 306 may convert the received optical signals to any combination of an SSRX0+/−USB differential electrical signal, an SSRX1+/−USB differential electrical signal, an SSRX USB electrical signal, and one or more CC electrical signals. These electrical signals correspond to their optical counterparts. These signals are transmitted from electro-optical interface 106 to USB system 108 via the appropriate terminals. In one aspect, the SSRX0+/−USB differential electrical signal is transmitted from SSRX0+/− terminal 314 to SSRX0+/− terminal 328; the SSRX1+/−USB differential electrical signal is transmitted from SSRX1+/− terminal 316 to SSRX1+/− terminal 330; the SBRX USB electrical signal is transmitted from SBRX terminal 322 to SBRX terminal 336, and CC terminal 320 and CC terminal 334 bidirectionally communicate USB CC electrical signals.

Referring back to FIG. 1, optical connector 122 can be implemented as a mode adaptive optical fiber transmission system compatible with USB protocol signals and/or Thunderbolt protocol signals. In one aspect, optical connector 122 includes an A-terminal interface and a B-terminal interface, implemented as electro-optical interface 104 and/or electro-optical interface 106. Since optical connector 122 is directionally independent with respect to connectivity, electro-optical interface 104 is an A-terminal interface and electro-optical interface 106 is a B-terminal interface in one configuration. In another configuration, electro-optical interface 106 is an A-terminal interface and electro-optical interface 104 is a B-terminal interface.

The active optical cable realized by optical connector 122 may include a symmetrical structure at both terminals, with no master-slave relationship and no directionality with respect to physical connections. In other words, optical connector may be reversed such that electro-optical interface 106 is connected to USB system 102, and electro-optical interface 104 is connected to USB system 108.

When connecting single-channel transmission devices, for example, USB3.0, USB3.1, etc. devices, using optical connector 122, either of bidirectional optical communication channel 110 or 112 may be enabled. In this case, the other bidirectional optical communication channel (i.e., bidirectional optical communication channel 112 or 110, respectively) can be disabled. Disabling a communication channel can conserve power.

When connecting two-channel transmission devices, for example, USB3.2 Gen1×2, USB3.2 Gen2×2, USB4.0 Gen2×2, USB4.0 Gen3×2, Thunderbolt 3, Thunderbolt 4, etc. devices using optical connector 122, both bidirectional optical communication channels 110 and 112 can be enabled to carry out dual-channel transmission. In one aspect, the original seven electrical interfaces associated with the USB or Thunderbolt protocols (i.e., SSTX0+/−, SSTX1+/−, SBRX0+/−, SBRX1+/−, SBTX, SBRX, and CC interfaces) are compressed into two or four optical interfaces (i.e., using either of bidirectional optical communication channels 110 or 112, or using both bidirectional optical communication channels 110 and 112). This compressing enables realizing optical fiber transmission (communication) relatively with low complexity, high integration, low power consumption, low cost as compared to contemporary solutions, while maintaining compatibility with USB3, USB4 and Thunderbolt protocols.

In one aspect, optical connector 122 is compatible with the USB protocol and Thunderbolt protocol in an associated physical layer, and does not need to carry out data format conversion between the USB protocol and the Thunderbolt protocol in a protocol layer. Examples of data format conversion include descrambling and decoding any received data, and then re-encoding and re-scrambling the data. Since optical connector 122 operates on a physical layer, such data format conversions are not needed.

Optical connector 122 is generally applicable to USB3.0, USB3.1 Gen1, USB3.1 Gen2, USB3.2 Gen1×2, USB3.2 Gen2, USB3.2 Gen2×2, USB4.0 and subsequent related USB protocols, Thunderbolt3, Thunderbolt4, and subsequent related Thunderbolt protocols.

In one aspect, the A-terminal interface and the B-terminal interface (e.g., electro-optical interfaces 104 and 106 respectively, or electro-optical interface 106 and 104 respectively) associated with optical connector 122 implements a combination of average optical power modulation and adaptive amplitude modulation order switching to realize high-speed signals of the USB protocol and the Thunderbolt protocol with a relatively small optical path overhead. This combination of average optical power modulation and adaptive amplitude modulation order switching enables optical connector 122 to simultaneously transmit sideband and channel configuration (CC) signals.

In one aspect, the A-terminal interface and B-terminal interface associated with optical connector 122 are configured with one or more monitoring units that are configured monitor LFPS signals to obtain channel configuration signals or sideband signals, and adaptively select single-channel mode or dual-channel mode.

In one aspect, optical connector 122 implements a high-speed signal transmission mode and a low-speed signal transmission mode consisting of sideband signals and passband configuration signals. According to different high-speed signal transmission modes, the functionality of optical connector 122 can be any one of a four-optical-fiber transmission mode and a two-optical-fiber transmission mode.

Figure 4:
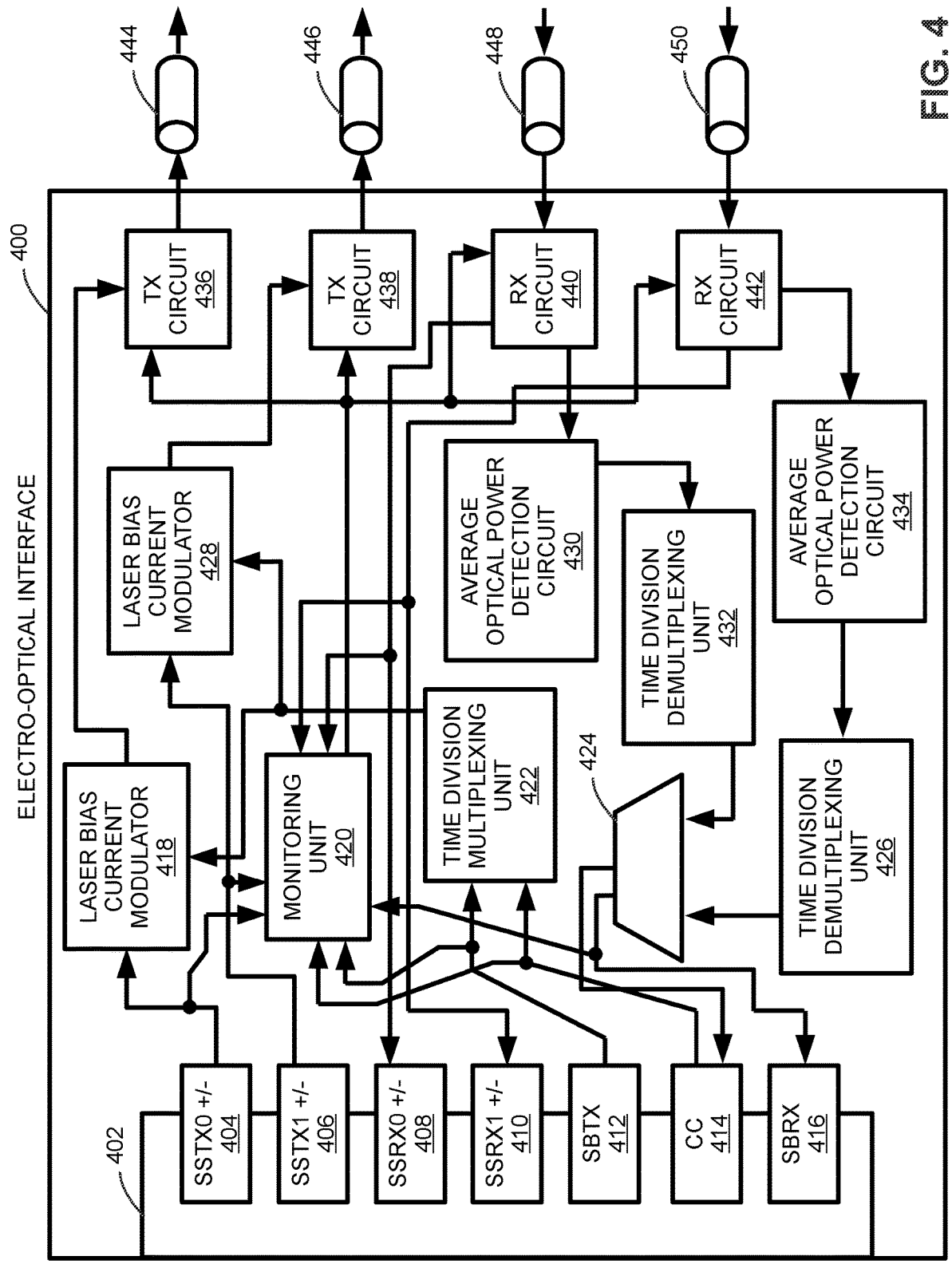
FIG. 4 is a block diagram depicting an embodiment of an electro-optical interface.

Moving to FIG. 4, FIG. 4 is a block diagram depicting an embodiment of an electro-optical interface 400. Electro-optical interface 400 may be used to implement either or both of electro-optical interface 104 and electro-optical interface 106. Electro-optical interface 400 may support two bidirectional optical communication channels.

As depicted, electro-optical interface 400 includes interface 402, laser bias current modulator 418, monitoring unit 420, time division multiplexing unit 422, multiplexer 424, time division demultiplexing unit 426, average optical power detection circuit 434, time division demultiplexing unit 432, average optical power detection circuit 430, laser bias current modulator 428, TX circuit 436, TX circuit 438, RX circuit 440, and RX circuit 442. Interface 402 further includes SSTX0+/− terminal 404 (that may be similar to SSTX0+/− terminal 216 or 310), SSTX1+/− terminal 406 (that may be similar to SSTX1+/− terminal 218 or 312), SSRX0+/− terminal 408 (that may be similar to SSRX0+/− terminal 220 or 314), SSRX1+/− terminal 410 (that may be similar to SSRX1+/− terminal 222 or 316), SBTX terminal 412 (that may be similar to SBTX terminal 224 or 318), CC terminal 414 (that may be similar to CC terminal 226 or 320), and SBRX terminal 416 (that may be similar to SBRX terminal 228 or 322).

In one aspect, interface 402 is a mechanical interface that is used to connect electro-optical interface 400 to a USB system such as USB system 102 or 108. Terminals SSTX0+/−404 through SBRX 416 electrically connect to the corresponding SSTX0+/− through SBRX terminals of the connected USB system.

In one aspect, SSTX0+/− and SSTX1+/− (USB differential electrical) signals are received from the connected USB system by SSTX0+/− terminal 404 and SSTX1+/− terminal 406, respectively. The SSTX0+/− and SSTX1+/− signals are respectively transmitted from SSTX0+/− terminal 404 and SSTX1+/− terminal 406 to laser bias current modulator 418 and laser bias current modulator 428, respectively. These SSTX0+/− and SSTX1+/− signals may be high-speed differential USB communication signals.

In one aspect, laser bias current modulator 418 converts the electrical SSTX0+/− signal into an optical SSTX0+/− signal. Laser bias current modulator 428 may convert the electrical SSTX1+/− signal into an optical SSTX1+/− signal.

In one aspect, SBTX terminal 412 receives one or more SBTX USB sideband (electrical) signals from the connected USB system.

In one aspect, CC terminal 414 receives one or more CC USB (electrical) signals from the connected USB system. These CC USB signals are transmitted to time division multiplexing unit 422.

In one embodiment, time division multiplexing unit 422 time-division multiplexes the SBTX USB sideband signals and the CC USB signals to generate a multiplexed electrical signal. This multiplexed electrical signal may be used to bias each of laser bias current modulator 418 and laser bias current modulator 428. In this way, the SBTX USB sideband signals and the CC USB signals may be used to modulate an average power level of each of the optical SSTX0+/− signal and the optical SSTX1+/− signal. Laser bias current modulator 418 outputs a laser bias current signal with an average power that is modulated by the time-division multiplexed SBTX USB sideband signals and the CC USB signal. Laser bias current modulator 428 outputs a laser bias current signal with an average power that is modulated by the time-division multiplexed SBTX USB sideband signals and the CC USB signal.

The laser bias current signal output from laser bias current modulator 418 is received by TX circuit 436. TX circuit 436 converts this signal into an optical signal and transmits the optical signal over a unidirectional optical communication channel 444. The laser bias current signal output from laser bias current modulator 428 is received by TX circuit 438. TX circuit 438 converts this signal into an optical signal and transmits the optical signal over a unidirectional optical communication channel 446. Each of TX circuit 436 and 438 may be a circuit configured to convert one or more electrical signals into corresponding optical signals, and may be similar in form and function to any of electro-optical conversion 230, electro-optical conversion 234, electro-optical conversion 304, and electro-optical conversion 308. Each of TX circuit 436 and 438 may be comprised of one or more (e.g., arrays of) VCSELs.

If electro-optical interface 400 functions similar to electro-optical interface 104, then TX circuit 436 functions similar to electro-optical conversion 230, and TX circuit 438 functions similar to electro-optical conversion 234. Unidirectional optical communication channels 444 and 446 correspond to unidirectional optical communication channels 114 and 118, respectively. The SSTX0+/− and SSTX1+/− optical signals modulated by SBTX USB sideband signals and CC USB signals are transmitted over unidirectional optical communication channels 444/114 and 446/118 respectively, to electro-optical interface 106, where these signals are received as SSRX0+/− and SSRX1+/− optical signals modulated by SBRX USB sideband signals and CC USB signals.

If electro-optical interface 400 functions similar to electro-optical interface 106, then TX circuit 436 functions similar to electro-optical conversion 304, and TX circuit 438 functions similar to electro-optical conversion 308. Unidirectional optical communication channels 444 and 446 correspond to unidirectional optical communication channels 116 and 120, respectively. The SSTX0+/− and SSTX1+/− optical signals modulated by SBTX USB sideband signals and CC USB signals are transmitted over unidirectional optical communication channels 444/116 and 446/120 respectively, to electro-optical interface 104, where these signals are received as SSRX0+/− and SSRX1+/− optical signals modulated by SBRX USB sideband signals and CC USB signals.

In one aspect, electro-optical interface 400 receives one or more optical signals via unidirectional optical communication channels 448 and 450. Electro-optical interface 400 may receive a combination of an SSRX0+/−USB optical differential signal, one or more SBRX USB optical signals, and one or more CC USB optical signals, via unidirectional optical communication channel 448. Electro-optical interface 400 may receive a combination of an SSRX1+/−USB optical differential signal, one or more SBRX USB optical signals, and one or more CC USB optical signals, via unidirectional optical communication channel 450.

The optical signals received over unidirectional optical communication channel 448 may be received by RX circuit 440. The optical signals received over unidirectional optical communication channel 450 may be received by RX circuit 442. In one aspect, each of RX circuit 440 and 442 may be configured to convert any received optical signals to corresponding electrical signals. Each of RX circuit 440 and 442 may be comprised of one or more (e.g., arrays of) photodetectors.

In one aspect, RX circuit 440 converts a received SSRX0+/−USB optical differential signal into an SSRX0+/−USB electrical differential signal that is transmitted from RX circuit 440 to SSRX0+/− terminal 408. SSRX0+/− terminal 408 may transmit the SSRX0+/−USB electrical differential signal to a connected USB system (e.g., USB system 102 or 108).

In one aspect, RX circuit 442 converts a received SSRX1+/−USB optical differential signal into an SSRX1+/−USB electrical differential signal that is transmitted from RX circuit 442 to SSRX1+/− terminal 410. SSRX0+/− terminal 410 may transmit the SSRX0+/−USB electrical differential signal to a connected USB system (e.g., USB system 102 or 108).

In one aspect, average optical power detection circuit 430 extracts an average optical power from the SSRX0+/− optical differential signal as received by RX circuit 440. Average optical power detection circuit 430 may extract one or more SBRX USB electrical signals and one or more CC USB electrical signals from the average optical power, and transmit the SBRX USB electrical signals and CC electrical USB signals to time division demultiplexing unit 432. Time division demultiplexing unit 432 may be configured to demultiplex the SBRX USB electrical signals and CC USB electrical signals, and transmit these signals to multiplexer 424.

In one aspect, average optical power detection circuit 434 extracts an average optical power from the SSRX1+/− optical differential signal as received by RX circuit 442. Average optical power detection circuit 434 may extract one or more SBRX USB electrical signals and one or more CC USB electrical signals from the average optical power, and transmit the SBRX USB electrical signals and CC USB electrical signals to time division demultiplexing unit 426. Time division demultiplexing unit 426 may be configured to demultiplex the SBRX USB electrical signals and CC USB electrical signals, and transmit these signals to multiplexer 424.

In one aspect, multiplexer 424 multiplexes and appropriately routes the SBRX USB electrical signals and the CC USB electrical signals received from time division demultiplexing units 426 and 432, to CC terminal 414 and SBRX terminal 416 respectively. These signals may then be transmitted by electro-optical interface 404 to a connected USB system (e.g., USB system 102 or 108).

When electro-optical interface 400 functions similar to electro-optical interface 104, then RX circuit 440 functions similar to photoelectric conversion 232, and RX circuit 442 functions similar to photoelectric conversion 236. Unidirectional optical communication channels 448 and 450 correspond to unidirectional optical communication channels 116 and 120, respectively. The SSRX0+/− and SSRX1+/− optical signals modulated by SBTX USB sideband signals and CC USB signals are received over unidirectional optical communication channels 448/116 and 450/120 respectively, from electro-optical interface 106, where these signals are transmitted as SSTX0+/− and SSTX+/− optical signals modulated by SBTX USB sideband signals and CC USB signals, respectively.

When electro-optical interface 400 functions similar to electro-optical interface 106, then RX circuit 440 functions similar to photoelectric conversion 302, and RX circuit 442 functions similar to photoelectric conversion 306. Unidirectional optical communication channels 448 and 450 correspond to unidirectional optical communication channels 114 and 118, respectively. The SSRX0+/− and SSRX1+/− optical signals modulated by SBTX USB sideband signals and CC USB signals are received over unidirectional optical communication channels 448/114 and 450/118 respectively, from electro-optical interface 104, where these signals are transmitted as SSTX0+/− and SSTX+/− optical signals modulated by SBTX USB sideband signals and CC USB signals, respectively.

In one aspect, monitoring unit 420 monitors each of the SSTX0+/−USB differential electrical signal at SSTX0+/− terminal 404, the SSTX1+/−USB differential electrical signal at SSTX1+/− terminal 406, the SSRX0+/−USB differential electrical signal at SSRX0+/− terminal 408, the SSRX1+/−USB differential electrical signal at SSRX1+/− terminal 410, the STBX USB electrical signals at SBTX terminal 412, the SBRX USB electrical signal at SBRX terminal 416, and the CC USB electrical signals at CC terminal 414 to determine a negotiation result of LFPS signals in high-speed signals during USB3 signal transmission. This monitoring enables electro-optical interface 400 to obtain channel configuration information associated with USB communication being performed by optical connector 122. When LFPS negotiation shows that single-channel communication is needed, SSTX1+/−, SSRX1+/− and related circuits (i.e., laser bias current modulator 428, TX circuit 438, RX circuit 422, average optical power detection circuit 434, and time division multiplexing unit 426) are powered down, thereby reducing cable power consumption in the single-channel communication mode.

Referring again back to FIG. 1, in one aspect, optical connector 122 implements a four-optical-fiber transmission structure. As depicted in FIG. 1, optical connector 122 uses two groups of bidirectional optical paths (i.e., bidirectional optical communication channels 110 and 112) in a four-optical-fiber configuration. Optical connector 122 may be adaptive to a single-channel or a dual-channel working mode compatible with the USB protocol and the Thunderbolt protocol. The A-terminal interface (e.g., electro-optical interface 104) of optical connector 122 may be symmetrical with the B-terminal interface (e.g., electro-optical interface 106). In other words, optical connector has no directionality with respect to connection.

At each port (i.e., electro-optical interface 104 and 106), high-speed signals SSTX0+/− and SSTX1+/− may be transferred to two lasers for transmission, and two receiving circuits receive the high-speed signals at the opposite terminal and output them to their own terminals SSRX0+/− and SSRX1+/−. In one aspect, optical connector 112 uses clock recovery circuit to resample a received signal.

A device A (e.g., USB system 102) is connected to the terminal A (e.g., electro-optical interface 104) and a device B (e.g., USB system 108) is connected to the terminal B (e.g., electro-optical interface 106). The A-terminal interface and the B-terminal interface are configured as a transmitting terminal and a receiving terminal. The transmitting terminal modulates sideband signals and channel configuration signals into the same optical path as high-speed signals for transmission through time division multiplexing and laser bias current modulation. The receiving terminal uses an average optical power detection circuit to separate low-speed signals and demultiplex and drive the sideband signals and channel configuration signals of the opposite end.

In one aspect, the high-speed signals SSTX0+/− and SSTX1+/− at the terminal A are modulated to two different transmitting circuits (e.g., electro-optical conversion 230 and electro-optical conversion 234) respectively. These high-speed signals are then converted into optical signals through photoelectric conversion and transmitted to the terminal B through two optical fibers. After electro-optical conversion and processing the received signal through two different receiving circuits (e.g., photoelectric conversion 304 and 308), terminal B demodulates the high-speed signals from the modulated optical signals and transmits them to two pins (terminals) SSRX0+/− and SSRX1+/− at the terminal B.

At the same time of high-speed signal transmission at terminal A, sideband signal (SBTX) and channel configuration signal (CC) are modulated on the bias current of the laser after time division multiplexing, and the average optical power is modulated on the output optical signal of the laser. The adjusted optical signal is transmitted to the terminal B through the optical path, then the low-speed signal is demodulated by the average optical power detection circuit at the terminal B. The sideband signal and channel configuration signal are decomposed by the time division multiplexing unit and transmitted to the SBRX pin and CC pin at the terminal B.

The high-speed signals SSTX0+/− and SSTX1+/− at the terminal B are modulated to two different transmitting circuits respectively, and then converted into optical signals through photoelectric conversion (e.g., using electro-optical conversion 304 and 308) and transmitted to the terminal A through two optical fibers (e.g., unidirectional optical communication channels 116 and 120). After electro-optical conversion and processing the received signal through two different receiving circuits (e.g., photoelectric conversion 232 and 236), the terminal A demodulates the high-speed signals from the modulated optical signals and transmits them to two pins SSRX0+/− and SSRX1+/− at the terminal A.

The sideband signal (SBTX) and channel configuration signal (CC) at the terminal B are modulated on the bias current of the laser after time division multiplexing, and the average optical power is modulated on the output optical signal of the laser. The adjusted optical signal is transmitted to the terminal A through the optical path, then the low-speed signal is demodulated by the average optical power detection circuit of the terminal A, and then the sideband signal and channel configuration signal are decomposed by the time division multiplexing unit and transmitted to the SBRX pin and CC pin of the terminal A.

In one aspect, when an adaptive channel associated with optical connector 122 is closed and the single channel communicates is enabled, and portions of optical connector 122 associated with the disabled channel are switched off. At this time, the power consumption is approximately half of the power consumption associated with dual-channel communication. In this configuration, SSTX1+/−, SSRX1+/− and related circuits are turned on when the LFPS negotiation result of USB3 shows that the system is dual-channel communication. In the definition of the USB4 protocol the sideband signal is used for channel configuration, so when sideband the signal is transmitted, a monitoring unit 420 associated with each of electro-optical interfaces 104 and 106 adaptively selects the working mode by acquiring the channel configuration of terminal A and terminal B, and shuts down the relevant channel in single channel mode to save power consumption.

Figure 5:
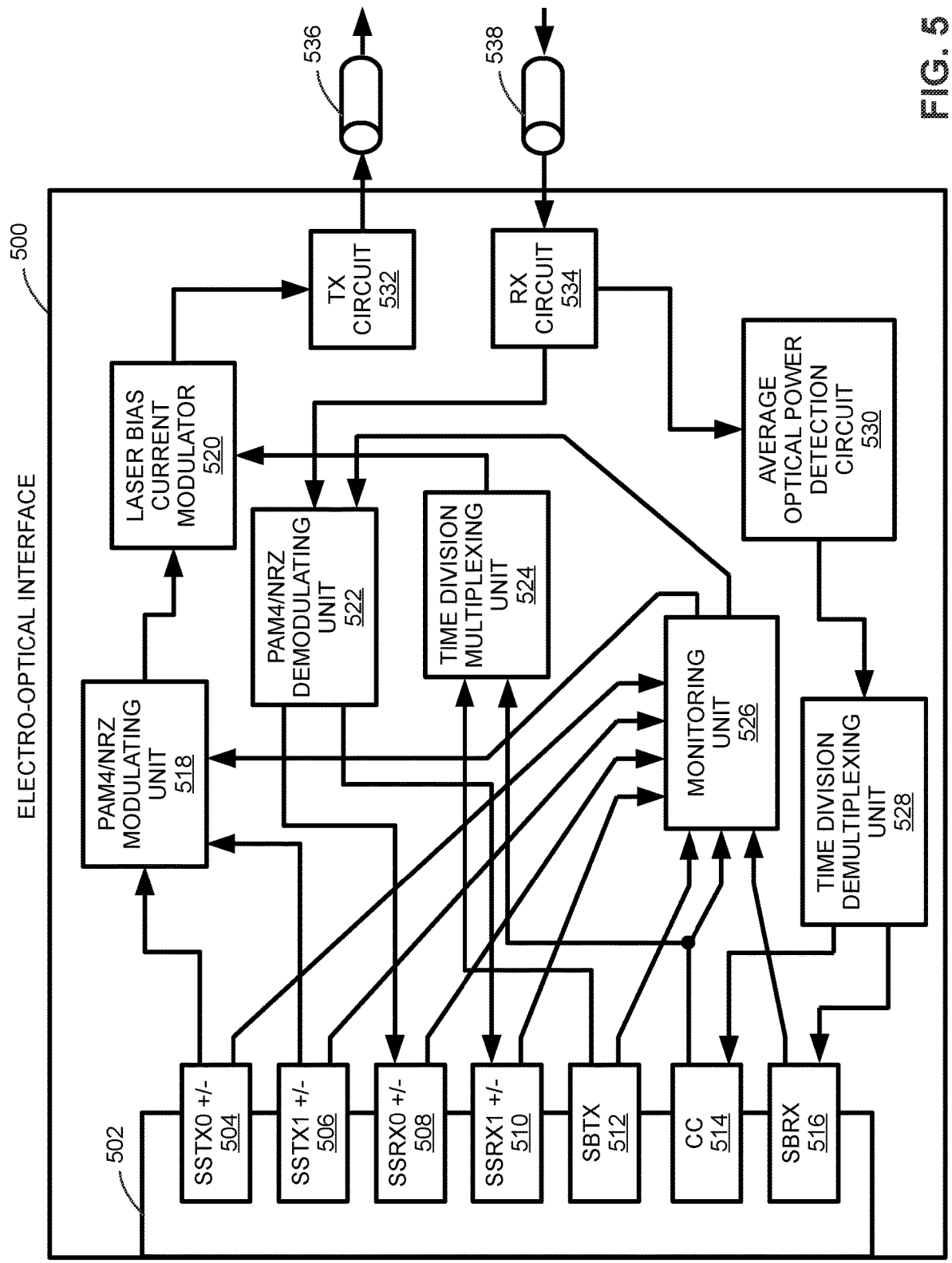
FIG. 5 is a block diagram depicting an embodiment of an electro-optical interface.

Turning now to FIG. 5, FIG. 5 is a block diagram depicting electro-optical interface 500. Electro-optical interface 500 may be used to implement either or both of electro-optical interface 104 and electro-optical interface 106. Electro-optical interface 500 may support a single bidirectional optical communication channel comprised of two individual unidirectional optical communication channels.

As depicted, electro-optical interface 500 includes interface 502, PAM4/NRZ modulating unit 518, laser bias current modulator 520, PAM4/NRZ demodulating unit 522, monitoring unit 526, time division multiplexing unit 524, time division demultiplexing unit 528, average optical power detection circuit 530, TX circuit 532, and RX circuit 534. Interface 502 further includes SSTX0+/− terminal 504 (that may be similar to SSTX0+/− terminal 216 or 310), SSTX1+/− terminal 506 (that may be similar to SSTX1+/− terminal 218 or 312), SSRX0+/− terminal 508 (that may be similar to SSRX0+/− terminal 220 or 314), SSRX1+/− terminal 510 (that may be similar to SSRX1+/− terminal 222 or 316), SBTX terminal 512 (that may be similar to SBTX terminal 224 or 318), CC terminal 514 (that may be similar to CC terminal 226 or 320), and SBRX terminal 516 (that may be similar to SBRX terminal 228 or 322).

In one aspect, electro-optical interface 500 is configured to transmit and receive any combination of 4-level pulse-amplitude modulated (PAM4) signals or non-return to zero (NRZ) signals.

In one aspect, interface 502 is a mechanical interface that is used to connect electro-optical interface 500 to a USB system such as USB system 102 or 108. Terminals SSTX0+/− 504 through SBRX 516 electrically connect to the corresponding SSTX0+/− through SBRX terminals of the connected USB system.

In one aspect, SSTX0+/− and SSTX1+/− (USB differential electrical) signals are received from the connected USB system by SSTX0+/− terminal 504 and SSTX1+/− terminal 506, respectively. The SSTX0+/− and SSTX1+/− signals are respectively transmitted from SSTX0+/− terminal 504 and SSTX1+/− terminal 506 to PAM4/NRZ modulating unit 518. These SSTX0+/− and SSTX1+/− signals may be high-speed differential USB communication signals.

In one aspect, PAM4/NRZ modulating unit 518 combines the electrical SSTX0+/− and SSTX1+/− electrical signals into a composite PAM4 electrical signal. This operation occurs when electro-optical interface operates in a two-channel communication mode. In a single-channel communication mode, only an SSTX0+/− electrical signal is received by electro-optical interface 500. In PAM4/NRZ modulating unit 518 modulates the SSTX0+/− electrical signal into an NRZ electrical signal. Laser bias current modulator 428 may convert the PAM4 or NRZ electrical signal output by PAM4/NRZ modulating unit 518 into an optical PAM4 or NRZ optical signal, respectively.

In one aspect, SBTX terminal 512 receives one or more SBTX USB sideband (electrical) signals from the connected USB system. These SBTX USB sideband signals are transmitted to time division multiplexing unit 524.

In one aspect, CC terminal 514 receives one or more CC USB (electrical) signals from the connected USB system. These CC USB signals are transmitted to time division multiplexing unit 524.

In one embodiment, time division multiplexing unit 524 time-division multiplexes the SBTX USB sideband signals and the CC USB signals to generate a multiplexed electrical signal. This multiplexed electrical signal may be used to bias laser bias current modulator 520. In this way, the SBTX USB sideband signals and the CC USB signals may be used to modulate an average power level of the PAM4 optical signal or NRZ optical signal (depending on the mode of communication).

Laser bias current modulator 520 outputs a laser bias current signal with an average power that is modulated by the time-division multiplexed SBTX USB sideband signals and the CC USB signal. Laser bias current modulator 520 outputs a laser bias current signal with an average power that is modulated by the time-division multiplexed SBTX USB sideband signals and the CC USB signal.

The laser bias current signal output from laser bias current modulator 520 is received by TX circuit 532. TX circuit 532 converts this signal into an optical signal and transmits the optical signal over a unidirectional optical communication channel 536. In one aspect, TX circuit 532 is a circuit configured to convert one or more electrical signals into corresponding optical signals, and may be similar in form and function to any of electro-optical conversion 230, electro-optical conversion 234, electro-optical conversion 304, and electro-optical conversion 308. TX circuit 532 may be comprised of one or more (e.g., arrays of) VCSELs.

If electro-optical interface 500 functions similar to electro-optical interface 104, then TX circuit 532 may function similar to electro-optical conversion 230. Unidirectional optical communication channel 536 may correspond to unidirectional optical communication channels 114. The SSTX0+/− optical signal or the combination of the SSTX0+/− and SSTX1+/− optical signals (depending on transmission mode), modulated by SBTX USB sideband signals and CC USB signals, are transmitted over unidirectional optical communication channel 536/114, to electro-optical interface 106, where these signals are received as SSRX0+/− and SSRX1+/− optical signals modulated by SBRX USB sideband signals and CC USB signals, respectively.

If electro-optical interface 500 functions similar to electro-optical interface 106, then TX circuit 532 may function similar to electro-optical conversion 304. Unidirectional optical communication channel 536 may correspond to unidirectional optical communication channels 116. The SSTX0+/− optical signal or the combination of the SSTX0+/− and SSTX1+/− optical signals (depending on the USB communication mode being used by electro-optical interface 500), modulated by SBTX USB sideband signals and CC USB signals, are transmitted over unidirectional optical communication channel 536/116, to electro-optical interface 104, where these signals are received as SSRX0+/− and SSRX1+/− optical signals modulated by SBRX USB sideband signals and CC USB signals, respectively.

In one aspect, electro-optical interface 500 receives one or more optical signals via unidirectional optical communication channel 538. Electro-optical interface 500 may receive a combination of an SSRX0+/− and an SSRX1+/−USB optical differential signal or an SSRX0+/−USB optical differential signal (depending on the USB communication mode being used by electro-optical interface 500), one or more SBRX USB optical signals, and one or more CC USB optical signals, via unidirectional optical communication channel 538.

The optical signals received over unidirectional optical communication channel 538 may be received by RX circuit 534. In one aspect, RX circuit 534 may be configured to convert any received optical signals to corresponding electrical signals. RX circuit 538 may be comprised of one or more (e.g., arrays of) photodetectors.

In a two-channel communication mode, RX circuit 534 may convert a received PAM4 optical signal into a PAM4 electrical signal. This PAM4 electrical signal may be comprised of an SSRX0+/−USB differential signal, an SSRX1+/−USB differential signal, an SBRX USB signal, and one or more CC USB signals. In one aspect, PAM4/NRZ demodulating unit 522 may extract an SSRX0+/−USB electrical differential signal and an SSRX1+/−USB electrical differential signal from the PAM4 electrical signal. PAM4/NRZ demodulating unit 522 may transmit the SSRX0+/−USB electrical differential signal and the SSRX1+/−USB electrical differential signal to SSRX0+/− terminal 508 and SSRX1+/− terminal 510, respectively. SSRX0+/− terminal 508 and SSRX1+/− terminal 510 may respectively transmit the SSRX0+/−USB electrical differential signal and the SSRX1+/−USB electrical differential signal to a connected USB system (e.g., USB system 102 or 108).

In a single-channel communication mode, RX circuit 534 may convert a received NRZ optical signal into a NRZ electrical signal. This NRZ electrical signal may be comprised of an SSRX0+/−USB differential signal, an SBRX USB signal, and one or more CC USB signals. In one aspect, PAM4/NRZ demodulating unit 522 may extract an SSRX0+/−USB electrical differential signal from the NRZ electrical signal. PAM4/NRZ demodulating unit 522 may transmit the SSRX0+/−USB electrical differential signal to SSRX0+/− terminal. SSRX0+/− terminal 508 may transmit the SSRX0+/−USB electrical differential signal to a connected USB system (e.g., USB system 102 or 108).

In one aspect, average optical power detection circuit 530 extracts an average optical power from the PAM4 or NRZ optical signal as received by RX circuit 534. Average optical power detection circuit 530 may extract one or more SBRX USB electrical signals and one or more CC USB electrical signals from the average optical power, and transmit the SBRX USB electrical signals and CC electrical USB signals to time division demultiplexing unit 528. Time division demultiplexing unite 532 may be configured to demultiplex the SBRX USB electrical signals and CC USB electrical signals, and transmit these signals to SBRX terminal 516 and CC terminal 514, respectively. SBRX terminal 616 and CC terminal 514 may respectively transmit the SBRX USB electrical signals and the CC USB electrical signals to a connected USB system (e.g., USB system 102 or 108).

If electro-optical interface 500 functions similar to electro-optical interface 104, then RX circuit 534 functions similar to photoelectric conversion 232. Unidirectional optical communication channel 538 corresponds to unidirectional optical communication channel 116. The PAM4 or NRZ optical signal modulated by SBTX USB sideband signals and CC USB signals are received over unidirectional optical communication channel 448/116, from electro-optical interface 106.

If electro-optical interface 400 functions similar to electro-optical interface 106, then RX circuit 534 functions similar to photoelectric conversion 302. Unidirectional optical communication channel 538 corresponds to unidirectional optical communication channel 114. The PAM4 or NRZ optical signal modulated by SBTX USB sideband signals and CC USB signals are received over unidirectional optical communication channels 448/114, from electro-optical interface 104.

In one aspect, monitoring unit 526 monitors each of the SSTX0+/−USB differential electrical signal, the SSTX1+/−USB differential electrical signal, SSRX0+/−USB differential electrical signal, the SSRX1+/−USB differential electrical signal, the STBX USB electrical signals, the SBRX USB electrical signal, and the CC USB electrical signals to determine a negotiation result of LFPS signals in high-speed signals during USB3 signal transmission. This enables electro-optical interface 500 to obtain channel configuration information associated with USB communication being performed by optical connector 122. When LFPS negotiation shows that single-channel communication is needed, SSTX1+/−, SSRX1+/− and related circuits are powered down, thereby reducing cable power consumption in the single-channel communication mode. In one aspect, a single- or dual-channel communication configuration in USBB 4 or Thunderbolt mode is determined based on monitoring sideband negotiation (e.g., LFPS sideband negotiation).

In one aspect, optical connector 122 uses one group of bidirectional optical paths (i.e., two optical fibers) for signal transmission. In this case, each of electro-optical interface 104 and 106 has a structure similar to electro-optical interface 500. In this configuration, optical connector 122 may be adaptive to the single-channel and dual-channel working modes compatible with USB protocol and the Thunderbolt protocol. The A-terminal interface (e.g., electro-optical interface 104) of active optical cable is symmetrical with the B-terminal interface (e.g., electro-optical interface 106), and the optical cable has no directionality.

At each port (i.e., electro-optical interface 104 or 106), high-speed signals SSTX0+/−, SSTX1+/− may be modulated into the same laser (e.g., as included in TX circuit 532) for transmission. In dual-channel communication, two high-speed signals are modulated into PAM4 signals, while in single-channel communication, high-speed signals are transmitted by NRZ coding. The receiving terminal selects PAM4 demodulation or NRZ demodulation according to channel configuration (i.e., subsequent to decoding CC USB communication signals) and then outputs them to its own SSRX0+/−, SSRX1+/− terminals. In one aspect, each electro-optical interface included in optical connector 122 uses a clock recovery circuit to extract the clock from the output of the threshold decider in the middle of the signal, and resamples the signal with the extracted clock signal.

Particularly, high-speed signals SSTX0+/− and SSTX1+/− at terminal A are modulated to the same transmitting circuit by PAM4, and then converted into optical signals by photoelectric conversion and transmitted to terminal B through an optical fiber. After passing through the electro-optical conversion and PAM4 receiving circuit, the signals are converted into two NRZ signals SSRX0+/− and SSRX1+/− by PAM4 demodulation unit and transmitted to terminal B. Same as the four-fiber transmission method, in the two-optical-fiber transmission method, the out-of-band signal and the channel configuration signal are modulated by the laser bias current, and demodulated by the average optical power detection when receiving. B-terminal high-speed signals SSTX0+/−, SSTX1+/− are modulated to the same transmitting circuit by PAM4, and then converted into optical signals through photoelectric conversion and PAM4 receiving circuit, and then the signals are converted into two NRZ signals, SSRX0+/− and SSRX1+/−, through PAM4 demodulation unit and transmitted to A-terminal. A detection unit 1 and a detection unit 2 (each of which may be similar to monitoring unit 526) use the monitoring results of LFPS signals or sideband signals at the A and B terminals to determine the channel configuration, respectively. PAM4 coding modulation and demodulation is selected in the dual-channel configuration, and NRZ coding modulation and demodulation is selected in the single-channel configuration, and some circuits are turned off at the same time to save power consumption.

Figure 6:
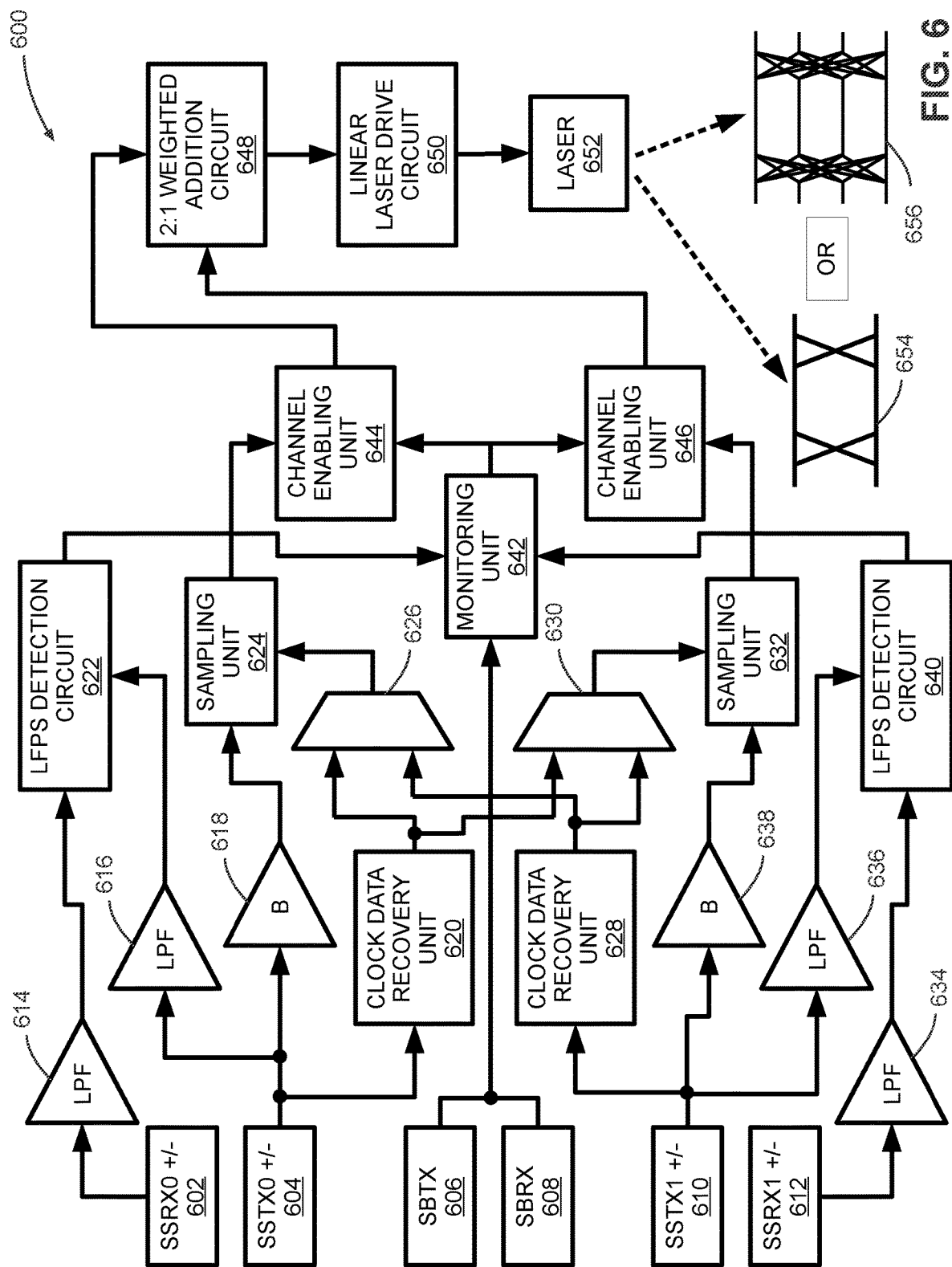
FIG. 6 is a block diagram depicting an embodiment of a modulating circuit.

FIG. 6 is a block diagram depicting an embodiment of a modulating circuit 600. As depicted, modulating circuit 600 includes SSRX0+/− terminal 602, SSTX0+/− terminal 604, SBTX terminal 606, SBRX terminal 608, SSTX1+/− terminal 610, SSRX1+/− terminal 612, low-pass filter LPF 614, low-pass filter LPF 634, low-pass filter LPF 616, low-pass filter LPF 636, buffer B 618, buffer B 638, clock data recovery unit 620, clock data recovery unit 628, LFPS detection circuit 622, LFPS detection circuit 640, selection switch 626, selection switch 630, sampling unit 624, sampling unit 632, monitoring unit 642, channel enabling unit 644, channel enabling unit 646, 2:1 weighted addition circuit 648, linear laser drive circuit 650, and laser 652.

Modulating circuit may be implemented in electro-optical interface 500 and may perform adaptive PAM4/NRZ modulation functions depending on channel configuration. In one aspect, SSRX0+/− terminal 602 corresponds to SSRX0+/− terminal 508, SSTX0+/− terminal 604 corresponds to SSTX0+/− terminal 504, SBTX terminal 606 corresponds to SBTX terminal 512, SBRX terminal 608 corresponds to SBRX terminal 516, SSTX1+/− terminal 610 corresponds to SSTX1+/− terminal 506, and SSRX1+/− terminal 612 corresponds to SSRX1+/− terminal 510. Monitoring unit 642 may correspond to monitoring unit 526.

In one aspect, an SSRX0+/−USB differential electrical signal received at SSRX0+/− terminal 602 is low-pass filtered by LPF 614 and transmitted to LFPS detection circuit 622. An SSRX1+/− differential electrical signal received at SSRX1+/− terminal 612 is low-pass filtered by LPF 634 and transmitted to LFPS detection circuit 640.

In one aspect, an SSTX0+/−USB differential electrical signal at SSTX0+/− terminal 604 is transmitted to:
 LPF 616 that low-pass filters the SSTX0+/−USB differential electrical signal and transmits the filtered signal to LFPS detection circuit 622,
 Buffer B 618 that amplifies the SSTX0+/−USB differential electrical signal and transmits the amplified signal to sampling unit 624, and
 Clock data recovery unit 620 that performs clock data recover on the SSTX0+/−USB differential electrical signal.

In one aspect, an SSTX1+/−USB differential electrical signal at SSTX1+/− terminal 610 is transmitted to:
 LPF 636 that low-pass filters the SSTX1+/−USB differential electrical signal and transmits the filtered signal to LFPS detection circuit 640,
 Buffer B 636 that amplifies the SSTX1+/−USB differential electrical signal and transmits the amplified signal to sampling unit 632, and
 Clock data recovery unit 628 that performs clock data recover on the SSTX1+/−USB differential electrical signal.

An SBTX USB electrical signal at SBTX terminal 606 and an SBRX signal at SBRX terminal 608 may both be transmitted to monitoring unit 642.

In one aspect, modulating circuit 600 implements adaptive PAM4/NRZ modulation uses the circuit structure of the transmitting part when using a single bidirectional optical communication channel that uses two optical fibers. An example of such an implementation is electro-optical interface 500.

In one aspect, clock and data recovery unit 620 is used to recover a clock signal from the input high-speed signal (i.e., the SSTX0+/−USB differential electrical signal at SSTX0+/− terminal 604), and the recovered clock signal is used to resample the signal. The recovered clock unit as output by clock data recovery unit 620 in a single-channel configuration may only drive sampling 624 to sample the data of the SSTX0+/−USB differential electrical signal. The recovered clock signal as output by clock data recovery unit 620 in a dual-channel configuration may drive sampling unit 624 and sampling unit 632 at the same time, and may be used to sample signals of terminals SSTX0+/− 604 and SSTX1+/− 610 at the same time.

In one aspect, clock data recovery unit 628, selection switch 626, and selection switch 630 are used to provide redundant logic for the clock recovery circuit to improve the fault tolerance of the circuit. This is done by recovering a clock signal from the SSTX1+/−USB differential electrical signal at SSTX1+/− terminal 610. The two clock signals output by clock data recovery units 620 and 628 are multiplexed by selection switches 626 and 630, to sampling units 624 and 632, respectively.

After sampling, the output signals of sampling unit 624 and sampling unit 632 may be transmitted to channel enabling unit 644 and channel enabling unit 646, respectively. Each of channel enabling unit 644 and 646 may be controlled by an output of monitoring unit 642. Monitoring unit 642 may be configured to independently enable or disable each of channel enabling unit 644 and 646 depending on how an SBTX USB electrical signal from SBTX terminal 606, an SBRX USB electrical signal from SBRX terminal 608, an output from LFPS detection circuit 622, and an output from LFPS detection circuit 640 are processed. Each of LFPS detection circuit 622 and LFPS detection circuit 624 determines whether USB sideband signals are present in the respective input signals. Based on this determination, LFPS detection circuits 622 and 624 independently determine whether a dual-channel mode or a single-channel mode is enabled. In one aspect, each of LFPS detection circuit 622 and 640 may be implemented as a filter and an envelope detector.

If monitoring unit 642 determines that a two-channel mode is enabled, both channel enabling units 642 and 646 may be enabled. In the dual-channel mode, the outputs of channel enabling units 644 and 646 are received by 2:1 weighted addition circuit 648. 2:1 weighted addition circuit 648 performs a weighting and addition on the two input signals to generate a PAM4 modulation electrical signal. Linear laser drive circuit 650 conditions this PAM4 modulation electrical signal and outputs the conditioned PAM4 electrical signal to laser 652 (e.g., a VCSEL). Laser 652 converts the conditioned PAM4 electrical signal to a PAM4 optical signal 656 that is transmitted over an appropriate optical communication channel (e.g., unidirectional optical communication channel 536). In the dual-channel mode, SSTX0+/− and SSTX1+/−USB signals are transmitted at the same time via PAM4 optical signal 656.

If monitoring unit 642 determines that a single-channel mode is enabled, components of modulating circuit 600 that support a second channel may be turned off to conserve power. In one aspect, SBTX1+/− terminal 610, SSRX1+/− terminal 612, clock data recovery unit 628, buffer 638, low pass filters 634 and 636, LFPS detection circuit 640, sampling unit 632, selection switch 630, and channel enabling unit 646 are turned off in the single-channel mode. In the single-channel mode, the output of channel enabling unit 644 is received by 2:1 weighted addition circuit 648. 2:1 weighted addition circuit 648 generates an NRZ modulation electrical signal based on this input. Linear laser drive circuit 650 conditions this NRZ modulation electrical signal and outputs the conditioned NRZ electrical signal to laser 652 (e.g., a VCSEL). Laser 652 converts the conditioned NRZ electrical signal to a NRZ optical signal 654 that is transmitted over an appropriate optical communication channel (e.g., unidirectional optical communication channel 536).

Figure 7:
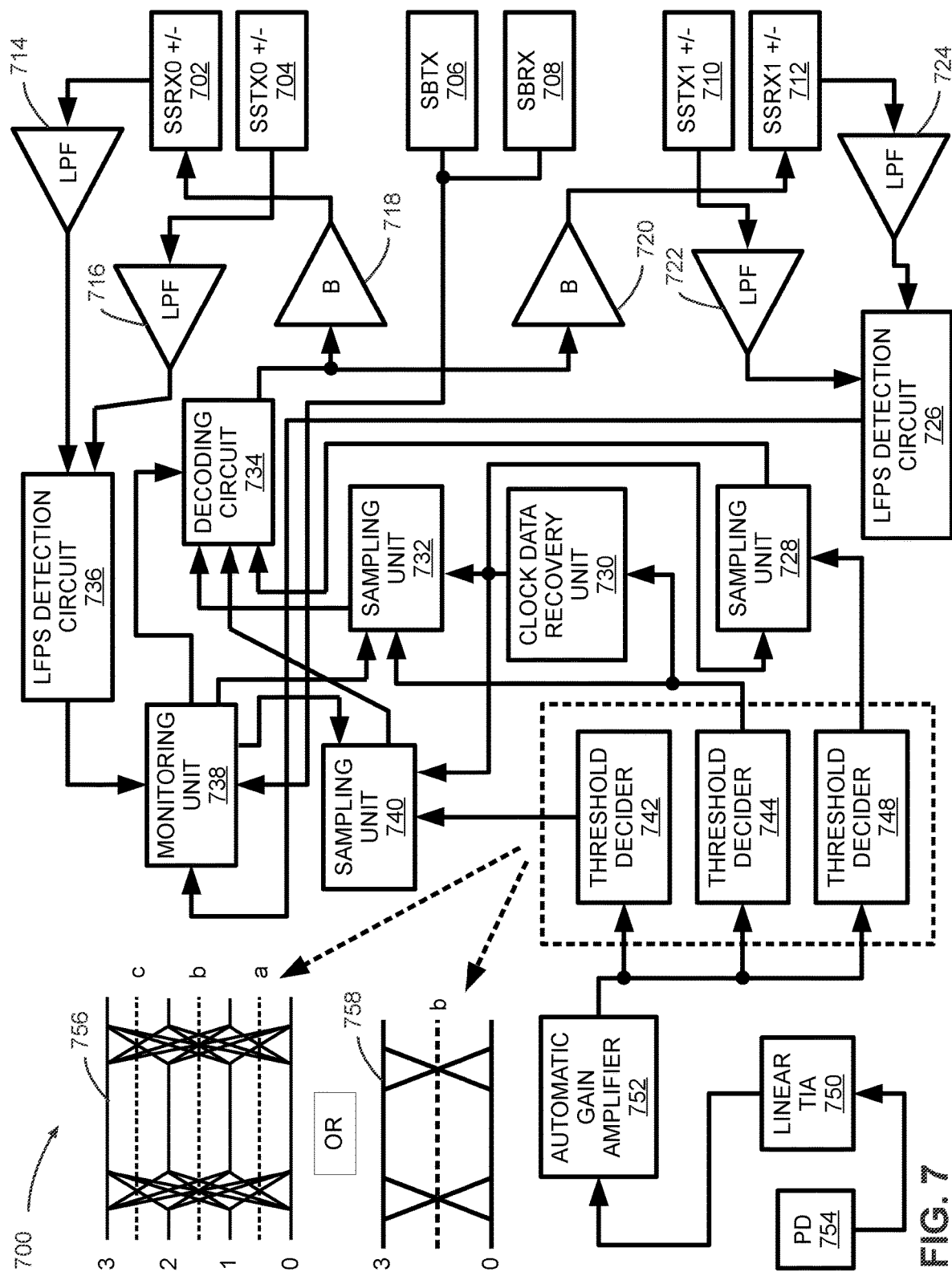
FIG. 7 is a block diagram depicting an embodiment of a demodulating circuit.

FIG. 7 is a block diagram depicting an embodiment of a demodulating circuit 700. As depicted, demodulating circuit 700 includes SSRX0+/− terminal 702, SSTX0+/− terminal 704, SBTX terminal 706, SBRX terminal 708, SSTX1+/− terminal 710, SSRX1+/− terminal 712, low-pass filter LPF 714, low-pass filter LPF 724, low-pass filter LPF 716, low-pass filter LPF 722, buffer B 718, buffer BB 720, LFPS detection circuit 736, decoding circuit 734, LFPS detection circuit 726, sampling unit 732, clock data recovery unit 730, sampling unit 728, monitoring unit 738, sampling unit 740, threshold decider 742, threshold decider 744, threshold decider 748, automatic gain amplifier 752, linear transimpedance (TIA) amplifier 750, and photodetector PD 754.

Demodulating circuit 700 may be implemented in electro-optical interface 500 and may perform adaptive PAM4/NRZ demodulation functions depending on channel configuration. In one aspect, SSRX0+/− terminal 702 corresponds to SSRX0+/− terminal 508, SSTX0+/− terminal 704 corresponds to SSTX0+/− terminal 504, SBTX terminal 706 corresponds to SBTX terminal 512, SBRX terminal 708 corresponds to SBRX terminal 516, SSTX1+/− terminal 710 corresponds to SSTX1+/− terminal 506, and SSRX1+/− terminal 712 corresponds to SSRX1+/− terminal 510.

In one aspect, photodetector PD 754 receives an optical signal over an optical communication channel such as unidirectional optical communication channel 114 or 118 (if demodulating circuit is integrated into electro-optical interface 106), or unidirectional optical communication channel 116 or 120 (if demodulating circuit is integrated into electro-optical interface 104). Photodetector PD 754 converts the received optical signal into an electrical current signal that is then amplified by linear TIA 750. Linear TIA 750 amplifies the electrical current signal into a differential voltage signal. Automatic gain amplifier 752 may perform further amplification on the differential voltage signal and transmit the amplified differential voltage signal to threshold deciders 742, 744 and 748.

If demodulating circuit 700 operates in a two-channel communication mode, a combination of threshold deciders 742, 744 and 748 may derive amplitude coding information from the amplified differential voltage signal to extract a PAM4 modulation electrical signal 756 from the amplified differential voltage signal. In one aspect, this extraction is performed relative to a threshold level a, a threshold level b, and a threshold level c, as indicated in PAM4 modulation electrical signal 756. In general, threshold level c>threshold level b>threshold level a with respect to amplitude values. In one aspect, the decision thresholds a, b and c are between numerical values of 2 and 3, 1 and 2, and 0 and 1 respectively. These numerical values may be associated with PAM4 modulation electrical signal 756.

If demodulating circuit operates in a one-channel communication mode, then threshold deciders 742, 744 and 748 may derive amplitude coding information from the amplified differential voltage signal generated by automatic gain amplifier 752, to extract an NRZ electrical signal 758. In one aspect, this extraction is performed relative to threshold level b as indicated in NRZ electrical signal 758. The threshold level b may be approximately midway between numerical values of 0 and 3. These numerical values may be associated with NRZ electrical signal 758.

In one aspect, outputs generated by threshold decider 742, 744, and 748 are transmitted to sampling unit 740, 732, and 728, respectively. The output generated by threshold decider 744 may also be transmitted to clock data recovery unit 730 that performs clock data recovery options on the received data. Each of sampling units 740, 732 and 728 may perform sampling on the respective input signal(s) referenced to a clock signal output by clock data recovery unit 730.

In one aspect, output signals generated by each of sampling units 740, 732 and 738 are received by decoding unit 734. Decoding unit 734 may extract SSRX0+/− and SSRX1+/− signals from the received signals. The SSRX0+/− signal may be transmitted from decoding unit 734 to buffer B 718 that amplifies the SSRX0+/− signal and transmits the amplified SSRX0+/− (differential electrical) signal to SSRX0+/− terminal 702. The SSRX1+/− signal may be transmitted from decoding unit 734 to buffer B 720 that amplifies the SSRX1+/− signal and transmits the amplified SSRX1+/− (differential electrical) signal to SSRX1+/− terminal 712.

In one aspect, LPF 714, 716, 722, and 724 function similar to LPF 614, 616, 636, and 634, respectively. Outputs of LPF 714 and 716 may be received by LFPS detection circuit 736. Outputs of LPF 722 and 724 may be received by LFPS detection circuit 726. Each of LFPS detection circuit 736 and 726 may be configured to perform LFPS signal detection on the received signals. Each of LFPS detection circuit 736 and LFPS detection circuit 726 determines whether USB sideband signals are present in the respective input signals. Based on this determination, LFPS detection circuits 736 and 726 independently determine whether a dual-channel mode or a single-channel mode is enabled.

In one aspect, monitoring unit 738 receives signals from LFPS detection circuits 736 and 726, and from SBTX terminal 706 and SBRX terminal 708. Monitoring unit 738 may be configured to control decoding circuit 734 and sampling unit 732 depending on how an SBTX USB electrical signal from SBTX terminal 706, an SBRX USB electrical signal from SBRX terminal 708, an output from LFPS detection circuit 736, and an output from LFPS detection circuit 726 are processed.

In one aspect, if monitoring unit 738 detects a one-channel (i.e., single-channel) configuration, sampling unit 732 uses only threshold level b to sample the input signal. In the one-channel configuration, decoding unit 734 may decode an associated USB high-speed communication signal as an NRZ signal. If monitoring unit 738 detects a two-channel configuration, all three threshold levels—a, b, and c may be used. In the one-channel configuration, decoding unit 734 may decode an associated USB high-speed communication signal as a PAM4 signal.

In one aspect, demodulating circuit 700 may be integrated into electro-optical interface 500. In this implementation, the photoelectric detector (i.e., photodetector PD 754) performs electro-optical conversion to convert the received optical signal into current. The linear transimpedance amplifier (i.e., linear TIA 750) converts the current into a differential voltage signal, and the automatic gain developer (i.e., automatic gain amplifier 752) adjusts the signal amplitude to a certain value.

In one aspect, the received signal is PAM4 signal in dual-channel operation mode, and the output of the automatic gain amplifier obtains signal amplitude coding information through threshold decider 742, threshold decider 744 and threshold decider 748 as shown in the PAM4 eye diagram (i.e., PAM4 modulation electrical signal 756). As shown in this PAM4 eye diagram, threshold a>threshold b>threshold c. If the associated PAM4 signal amplitude is 0, 1, 2 and 3, the decision thresholds a, b and c are between 2 and 3, 1 and 2 and 0 and 1 respectively.

In one aspect, the output signal of threshold decider 744 is extracted by clock data recovery unit 730, and the obtained clock signal drives sampling unit 732. Sampling unit 740, sampling unit 732, and sampling unit 728 respectively synchronously sample the outputs of threshold decider 742, threshold decider 744, and threshold decision 748. The outputs of the three samplers (i.e., sampling units 740, 732 and 728) constitute a three-bit thermometer code. When the input signal is 3, then 3>a, 3>b, 3>c, so the outputs of three sampling circuits are "111", "011" when the input signal is 2, and "001" and "000" when the input signals are 1 and 0 respectively.

In one aspect, decoding circuit 734 converts the thermometer code into a 2-bit binary code. The binary signal output by decoding circuit 734 may drive SSRX0+/− and SSRX1+/− terminals 702 and 712, respectively, through buffers 718 and 720.

Modulating circuit 700 may be configured to operate in a single-channel communication mode. In this mode, the signal received by photodetector 754 is an NRZ signal. It can be seen from NRZ eye diagram (i.e., NRZ electrical signal 758) that only the threshold level determiner b is used to output the determinable signal level. In the single-channel operation mode, only a portion of demodulating circuit 700 may be activated, with other portions of this circuit being powered down. For example, in a single-channel communication mode, photodetector 754, linear TIA 750, automatic gain amplifier 752, threshold decider 744, clock data recovery unit 730, sampling unit 732, decoding circuit 734, LFPS detection circuit 736, LPF 714 and 716, buffer 718, and SSRX0+/− terminal 702, SSTX0+/− terminal 704, SBTX terminal 706, and SBRX terminal 708 are activated, with the other components of demodulating circuit 700 being powered down. The above-mentioned single-channel or dual-channel operation mode is judged by monitoring unit 738 by monitoring the sideband signal and the LFPS signal.

Figure 8:
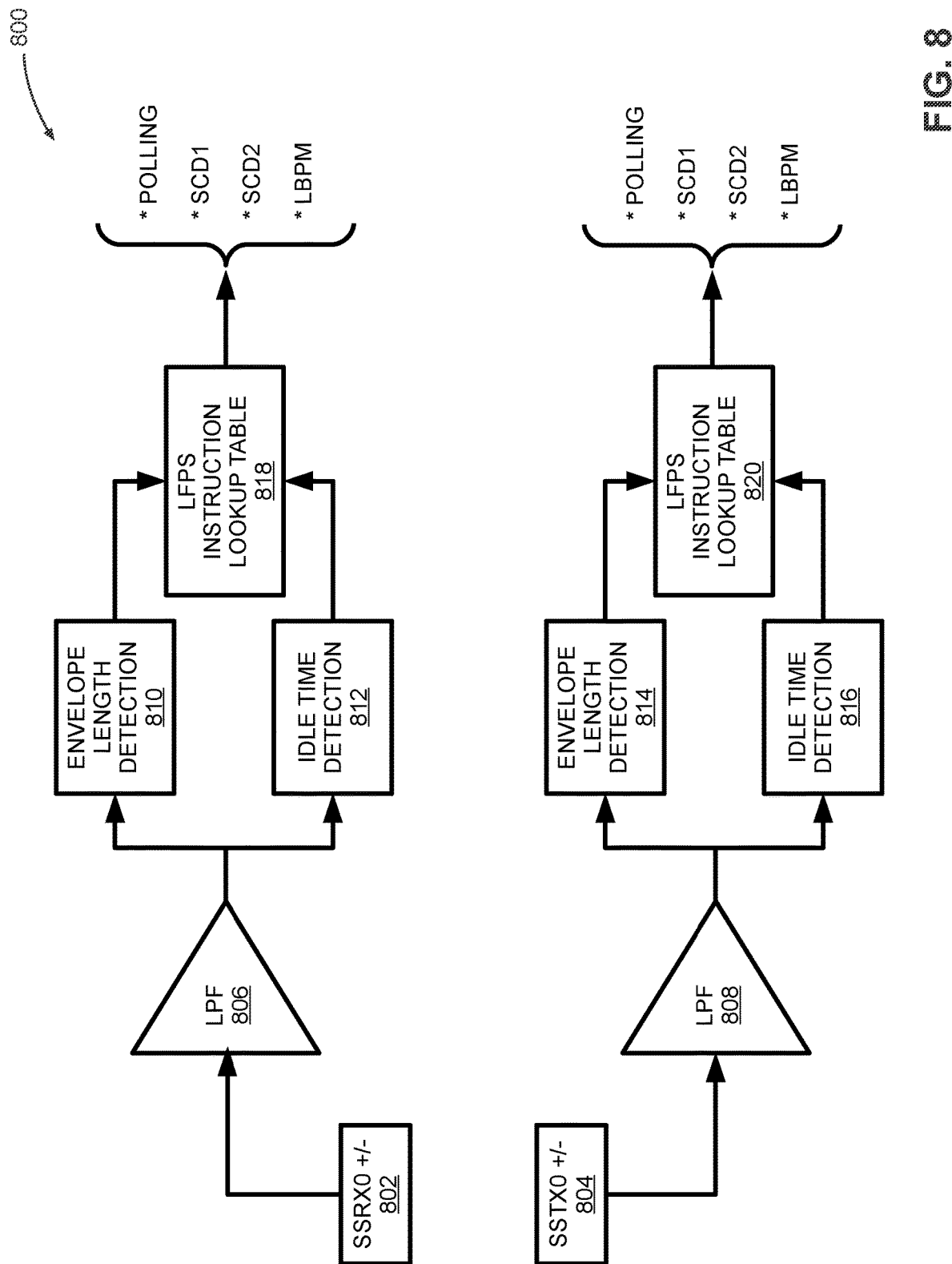
FIG. 8 is a block diagram depicting an embodiment of an LFPS signal monitoring circuit.

FIG. 8 is a block diagram depicting an embodiment of an LFPS signal monitoring circuit 800. As depicted, LFPS signal monitoring circuit 800 includes SSRX0+/− terminal 802, SSTX0+/− terminal 804, low pass filter LPF 806, low pass filter LPF 808, envelope length detection 810, envelope length detection 814, idle time detection 812, idle time detection 816, LFPS instruction lookup table 818, and LFPS instruction lookup table 820. LFPS signal monitoring circuit 800 may be used to implement any, some, or all of LSPF detection circuits 622, 640, 726, and 736.

In one aspect, SSRX0+/− terminal 802 and SSTX0+/− terminal 804 may respectively correspond to SSRX0+/− terminal 408 and SSTX0+/− terminal 404, or SSRX0+/− terminal 508 and SSTX0+/− terminal 504.

In one aspect, an SSRX0+/−USB differential electrical signal at SSRX0+/− terminal 802 is transmitted to LPF 806. The SSRX0+/−USB differential electrical signal may be comprised of a USB high-speed signal and one or more low-speed USB signals. LPF 806 may be configured to filter out the high-frequency components (i.e., the USB high-speed signal), and pass through the low-speed USB signals. In one aspect, the low-speed USB signals include one or more LFPS signals. The bandwidth of LPF 806 may be set to 50 MHz.

In one aspect, an output of LPF 806 is received by envelope length detection 810 and idle time detection 812. Envelope length detection 810 and idle time detection 812 may be configured to extract two main decision elements, burst time and repeat time, from the filtered SSRX0+/−USB differential electrical signal. In one aspect, the burst time and repeat time are received by LFPS instruction lookup table 818. LFPS instruction lookup table 818 may be configured to determine a presence of one or more of a polling signal, an SCD1 signal, an SCD2 signal, and an LBPM signal associated with the SSRX0+/−USB differential electrical signal. This presence may be determined by using a burst time and repeat time look-up table included in LFPS instruction lookup table 818.

In one aspect, an SSTX0+/−USB differential electrical signal at SSTX0+/− terminal 804 is transmitted to LPF 808. The SSTX0+/−USB differential electrical signal may be comprised of a USB high-speed signal and one or more low-speed USB signals. LPF 808 may be configured to filter out the high-frequency components (i.e., the USB high-speed signal), and pass through the low-speed USB signals. In one aspect, the low-speed USB signals include one or more LFPS signals. The bandwidth of LPF 808 may be set to 50 MHz.

In one aspect, an output of LPF 808 is received by envelope length detection 814 and idle time detection 816. Envelope length detection 814 and idle time detection 816 may be configured to extract two main decision elements, burst time and repeat time, from the filtered SSTX0+/−USB differential electrical signal. In one aspect, the burst time and repeat time are received by LFPS instruction lookup table 820. LFPS instruction lookup table 818 may be configured to determine a presence of one or more of a polling signal, an SCD1 signal, an SCD2 signal, and an LBPM signal associated with the SSRX0+/−USB differential electrical signal. This presence may be determined by using a burst time and repeat time look-up table included in LFPS instruction lookup table 820.

In one aspect, an LFPS signal monitoring circuit 800 is used for signal monitoring, power-on enumeration, rate negotiation and jump control of a Link Training and Status State Machine (LTSSM) during USB3 signal transmission. A special LBPM signal is added to USB3.2, in which a single channel or a dual channel control configuration is defined. Therefore, the channel configuration of USB3 can be obtained by monitoring one or more LFPS signals output by LPF 806 and/or LFP 808.

At the same time, LFPS signals at both terminals may be monitored by LFPS signal monitoring circuit 800 to judge the negotiation results of devices at both sides. When one terminal only has polling signals instead of SCD1 and SCD2 signals during LFPS negotiation, it means that an associated USB device (e.g., USB system 102 or 108) is a USB3.0 device and only supports single channel mode.

If both communication parties (e.g., USB system 102 and 108) use SCD1 and SCD2 signals for negotiation, it means that each of the associated USB device (i.e., each of USB system 102 and 108) is a USB3.1 or USB3.2 device. LFPS signal monitoring circuit 800 may further analyze an LBPM signal; if the LBPM signal only contains rate information but does not contain channel configuration information, then each USB device is a USB3.1 device, and communication is in a single channel mode.

If LBPM information contains channel configuration information, LFPS signal monitoring circuit 800 may analyze negotiation of channel configuration information at both terminals. Based on this analysis, a configuration of the party with low channel number in negotiation is taken as the channel configuration.

When each USB device (e.g., USB system 102 and 108) is a USB4 device, there is no LFPS signal in the high-speed channel. When a USB3 adapter exists in USB4, the LFPS signal is converted into a special packet for transmission. The channel configuration negotiation of USB4 is mainly conducted through sideband communication.

Figure 9:
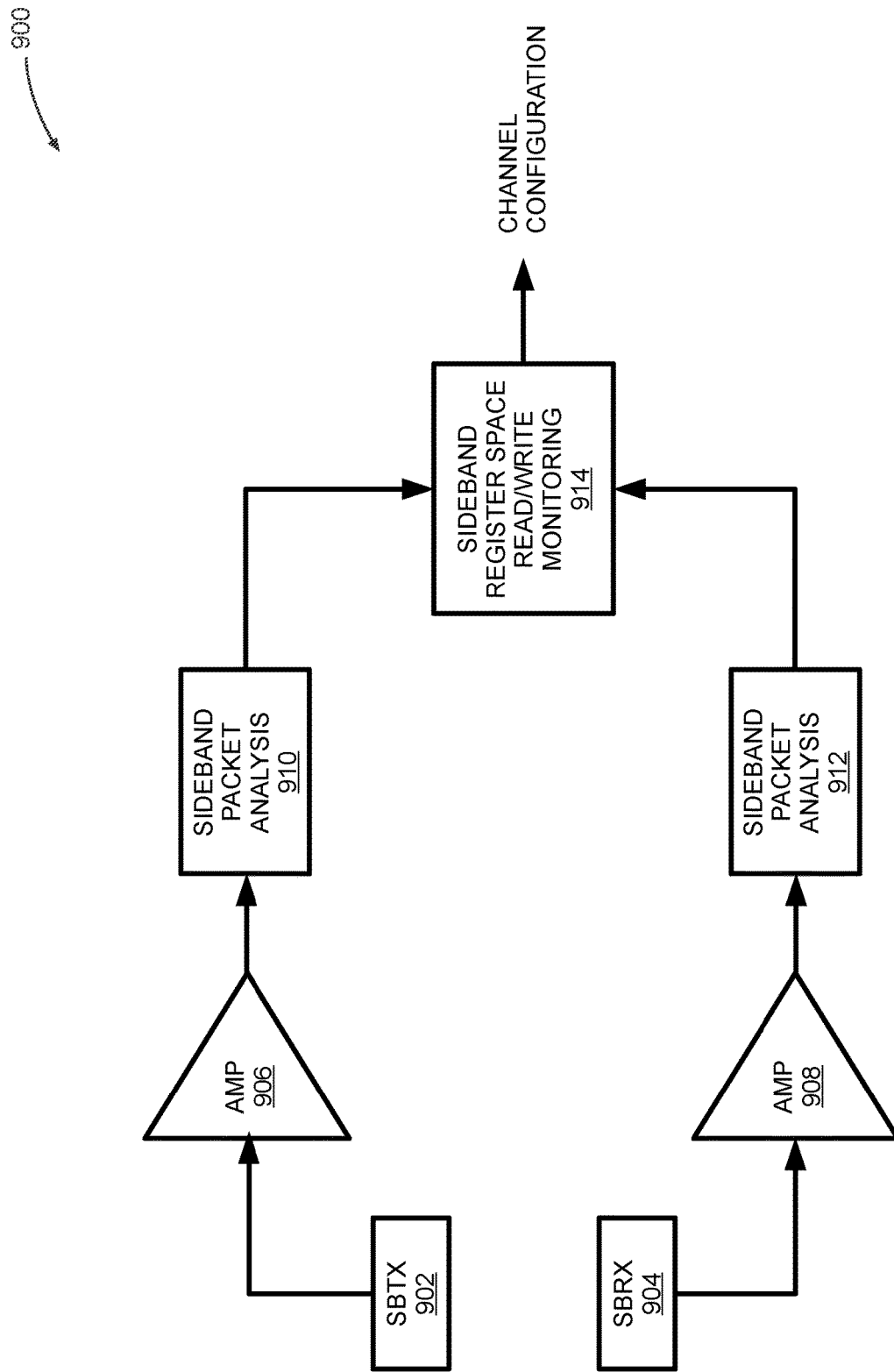
FIG. 9 is a block diagram depicting an embodiment of a sideband signal monitoring circuit.

FIG. 9 is a block diagram depicting an embodiment of a sideband signal monitoring circuit 900. As depicted, sideband signal monitoring unit 900 includes SBTX terminal 902, SBRX terminal 904, amplifier AMP 906, amplifier AMP 908, sideband packet analysis 910, sideband packet analysis 912, and sideband register space read/write monitoring 914. Sideband signal monitoring circuit 900 may be used to implement any, some, or all of monitoring units 420, 526, 642, and 738.

In one aspect, the sideband signal monitoring unit 900 monitors the sideband signals of the transmitting USB terminal and the receiving USB terminal at the same time to judge the channel configuration negotiation result of both terminals.

In one aspect, an SBTX signal at SBTX terminal 902 is amplified by AMP 906, and received by sideband packet analysis 910. Sideband packet analysis 910 may be configured to analyze a sideband packet contained in the SBTX signal to obtain a resolution of the associated sideband communication. An output of sideband packet analysis 910 may be transmitted to sideband register space read/write monitoring 914.

In one aspect, an SBRX signal at SBRX terminal 904 is amplified by AMP 908, and received by sideband packet analysis 912. Sideband packet analysis 912 may be configured to analyze a sideband packet contained in the SBRX signal to obtain a resolution of the associated sideband communication. An output of sideband packet analysis 912 may be transmitted to sideband register space read/write monitoring 914.

In one aspect, sideband register space read/write monitoring 914 analyzes signals from sideband packet analysis 910 and 912, and extracts the read-write information of channel configuration related registers in the associated sideband signal packet. Based on the extraction, sideband register space read/write monitoring 914 may obtain an associated channel configuration negotiation result, with the lowest channel number in both terminals of communication as the channel negotiation result.

In one aspect, sideband register space read/write monitoring 914 monitors the sideband signals of SBTX terminal 902 and SBRX terminal 904 at the same time to judge the channel configuration negotiation result of both terminals.

Figure 10:
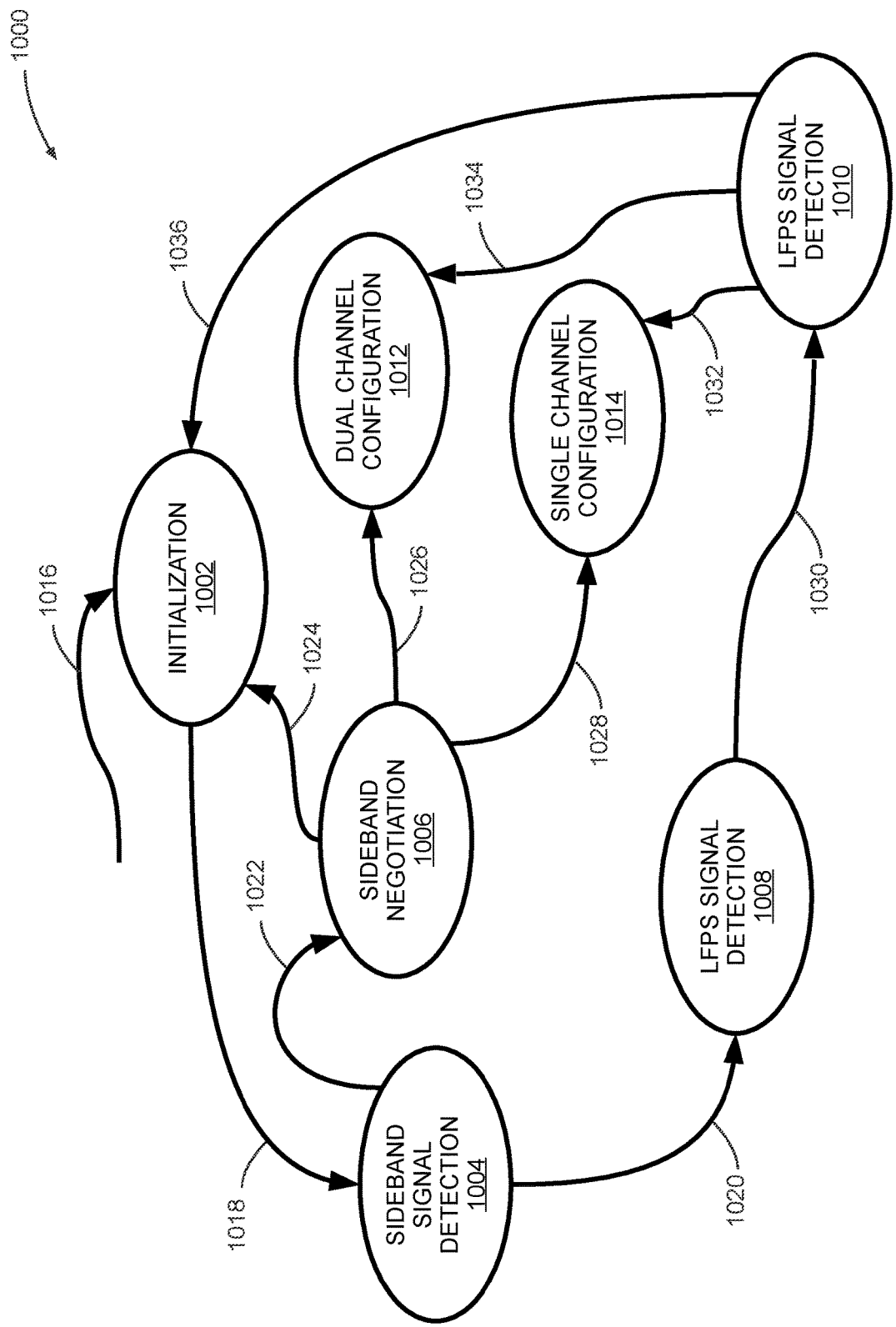
FIG. 10 is a state flow diagram depicting a monitoring of sideband signals and channel configuration signals.

FIG. 10 is a state flow diagram 1000 depicting a monitoring of sideband signals and channel configuration signals. In one aspect, the state flow receives an initialization USB signal 1016 and enters an initialization state 1002. From the initialization state, the state flow 1000 performs transition 1018 and transitions to a sideband signal detection state 1004. In the sideband signal detection state 1004, state flow 1000 analyzes the associated USB communication to determine a presence of one or more sideband signals in the USB signals.

If state flow 1000 detects one or more sideband signals, then the state flow undergoes transition 1022 to a sideband negotiation state 1006. The presence of a sideband signal indicates that USB4 communication is being performed. In sideband negotiation state 1006, state flow 1000 may perform a sideband negotiation to determine whether the associated USB communication is a single-channel USB communication or a dual-channel USB communication.

If sideband negotiation state 1006 determines that single-channel communication is being performed, then state flow 1000 performs transition 1028 to a single-channel configuration state 1014, where dual-channel USB4 communication may be performed.

If sideband negotiation state 1006 determines that dual-channel communication is being performed, then state flow 1000 performs transition 1026 to a dual-channel configuration state 1012, where dual-channel USB4 communication may be performed.

If sideband negotiation state 1006 determines that a communication error has occurred, then state flow 1000 may perform transition 1024 to initialization state 1002 for re-monitoring.

In one aspect, if state 1004 does not detect a sideband signal, then state flow 1000 performs transition 1020 to an LFPS signal detection state 1008. The absence of a sideband signal may indicate that USB3 communication is being performed. In one aspect, LFPS signal detection state 1008 may be an LFPS signal test state. This state may include testing the existence of one or more LFPS signals in the USB communication signals. This enables state flow 1000 to distinguish between an LFPS signal and a high-speed USB communication signal.

Once LFPS signal detection state 1008 completes all the associated functions, state flow 1000 may perform transition 1030 to an LFPS signal detection state 1010. In one aspect, LFPS signal detection state 1010 is an LFPS snooping state.

In this state one or more LFPS signals on both the transmit (TX) and receive (RX) sides are checked to determine a negotiation result between the two sides. Based on this, LFPS signal detection state 1010 determines whether the associated USB communication is a single-channel USB communication or a dual-channel USB communication.

If LFPS signal detection state 1010 determines that single-channel communication is being performed, then state flow 1000 performs transition 1032 to single-channel configuration state 1014, where dual-channel USB3 communication (or communication that uses an earlier USB protocol) may be performed.

If LFPS signal detection state 1010 determines that dual-channel communication is being performed, then state flow 1000 performs transition 1034 to single-channel configuration state 1012, where dual-channel USB3 communication (or communication that uses an earlier USB protocol) may be performed.

If LFPS signal detection state 1010 determines that a communication error has occurred, then state flow 1000 may perform transition 1036 to initialization state 1002 for re-monitoring.

In general, state flow diagram 1000 depicts a functionality of a sideband signal and channel configuration signal monitoring state machine. When the associated USB device is plugged in, the sideband signal and channel configuration signal monitoring state machine detects the sideband signal first, and if there is a sideband signal, monitors the sideband signal negotiation, and decides whether the configuration is single channel or dual channel. In one aspect, this functionality is implemented using sideband signal monitoring circuit 900.

If there is no sideband signal, LFPS negotiation monitoring is performed. In one aspect, the channel of USB3 is configured as a single channel or a dual channel according to the negotiation monitoring. If there are data errors and other abnormalities in the monitoring process, the process returns to the initialization state for re-monitoring. In one aspect, this functionality is implemented using LFPS signal monitoring circuit 800.

State flow diagram 1000 may be implemented on any of electro-optical interface 104, 106, 400, or 500. Specifically, elements of state flow diagram may be implemented using a combination of an LFPS detection circuit (e.g., 622, 640, 726, or 736) and a monitoring unit (e.g., 642 or 738).

Figure 11:
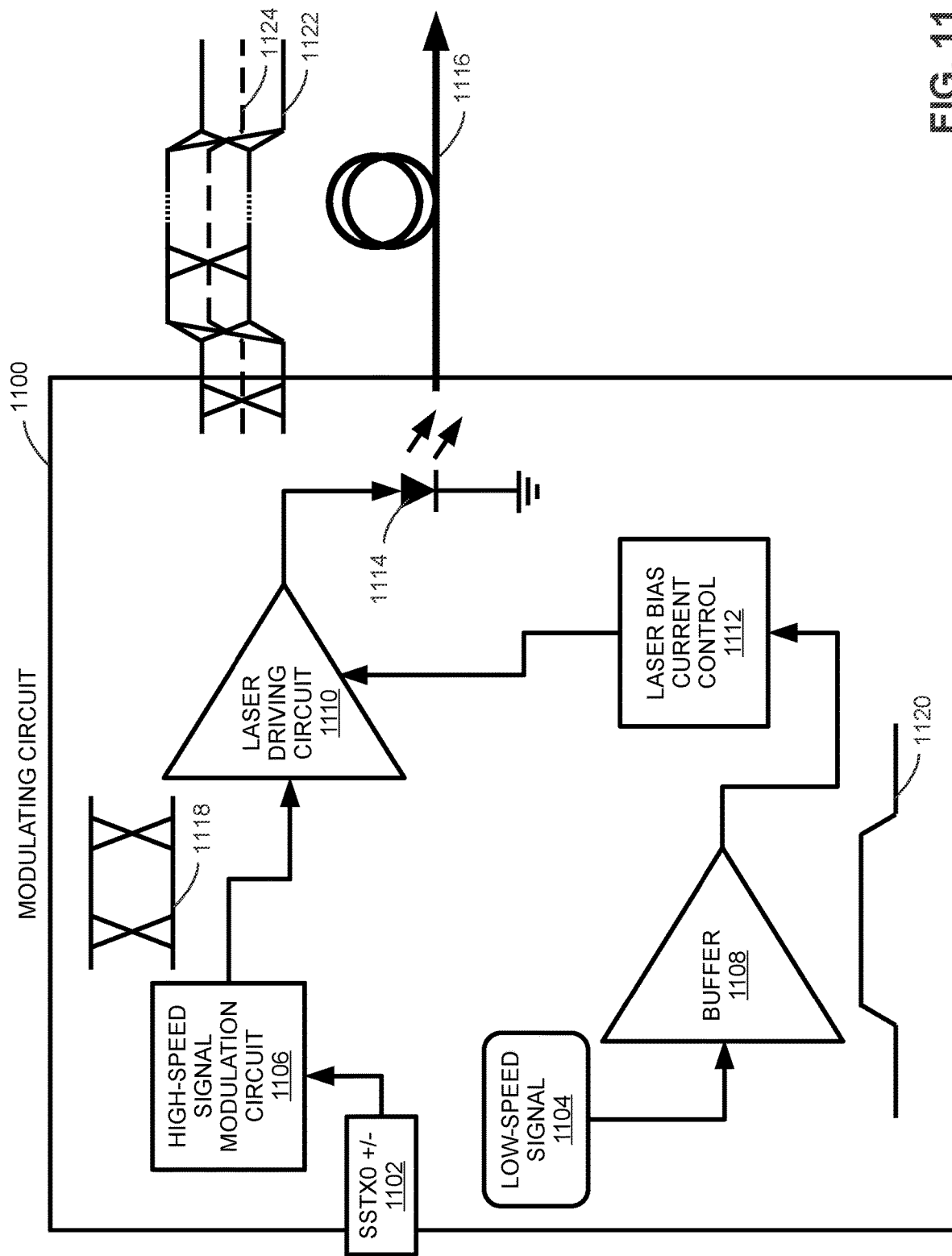
FIG. 11 is a circuit diagram depicting a modulating circuit.

FIG. 11 is a circuit diagram depicting a modulating circuit 1100. Modulating circuit may be configured to modulate low-speed signals onto USB high-speed signals. As depicted, modulating circuit 1100 includes SSTX0+/− terminal 1102, high-speed signal modulation circuit 1106, laser driving circuit 1110, laser bias control 1112, laser diode 1114, and buffer 1108.

SSTX0+/− terminal 1102 may be similar to SSTX0+/− terminal 202 or 324. An SSTX0+/− high-speed USB differential electrical signal received at SSTX0+/− terminal 1102 is transmitted to high-speed signal modulation circuit 1106. High-speed signal modulation circuit 1106 may transmit a high-speed NRZ electrical signal 1118 corresponding to the SSTX0+/− high-speed USB differential electrical signal, to laser driving circuit 1110.

In one aspect, a low-speed electrical signal 1104 is amplified by buffer 1108 to generate a low-speed amplified electrical signal 1120. Low-speed electrical signal 1104 may be comprised of one or more signals, including USB sideband and USB CC signals. Low-speed amplified electrical signal 1120 is input to laser bias current control 1112. Laser bias current control 1112 uses low-speed amplified electrical signal 1120 to modulate an average power of high-speed NRZ electrical signal 1118 via laser driving circuit 1110. Laser driving circuit 1110 may modulate the average power of high-speed NRZ electrical signal 1118 using the output of laser bias current control (based on low-speed amplified electrical signal 1120), to generate a composite electrical signal output. This composite electrical signal may be converted into an optical signal by laser diode 1114 to generate an optical NRZ signal 1122 that has an average optical power level 1124 in accordance with low-speed signal 1104. In one aspect, laser diode 1114 is a VCSEL.

In one aspect, optical NRZ signal 1122 is transmitted via a unidirectional optical communication channel 1116 to a destination USB device. Unidirectional optical communication channel 1116 may implemented using one or more optical fibers. Unidirectional optical communication channel 1116 may be any of unidirectional optical communication channel 114, 116, 118, or 120.

Figure 12:
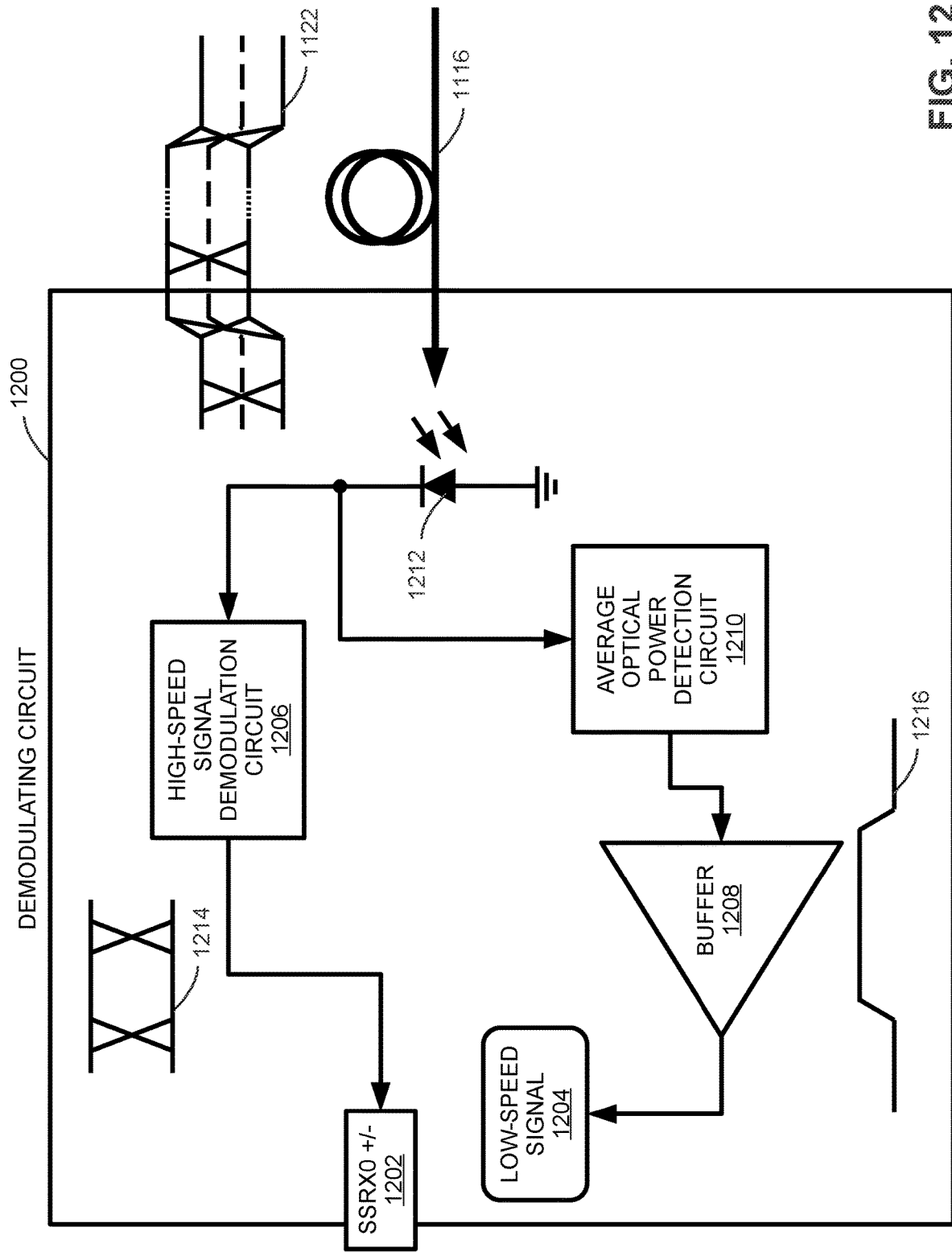
FIG. 12 is a circuit diagram depicting a demodulating circuit.

FIG. 12 is a circuit diagram depicting a demodulating circuit 1200. Modulating circuit may be configured to demodulate low-speed signals from a composite signal that includes one or more USB high-speed signals and the low-speed signals. As depicted, modulating circuit 1200 includes SSRX0+/− terminal 1202, high-speed signal demodulation circuit 1206, average optical power detection circuit 1210, buffer 1208, and photodetector 1212.

In one aspect, photodetector 1212 receives optical NRZ signal 1122 over unidirectional optical communication channel 1116. Photodetector 1212 may convert optical NRZ signal 1122 into a composite signal that has an average power modulation in accordance with low-speed signal 1104. High-speed signal demodulation circuit 1206 may demodulate the composite signal to generate an NRZ electrical signal 1214 that is received by SSRX0+/− terminal 1202. SSRX0+/− terminal 1202 may be similar to SSRX0+/− terminal 206 or 328. NRZ electrical signal 1214 may be substantially identical to NRZ electrical signal 1118.

In one aspect, average optical power detection circuit 1210 extracts an average optical power from the composite electrical signal output by photodetector 1212, to generate a low-speed electrical signal 1216. This low-speed signal 1216 may be amplified by buffer 1208 and output as a low-speed signal 1204 that may be substantially identical to low-speed signals 1104.

In one aspect, in order to realize the long-distance and low electromagnetic radiation transmission of USB signals, the sideband signal and channel configuration signal (CC) signals (i.e., the low-speed USB signals) are transmitted simultaneously with the high-speed signals along optical fiber path (i.e., using a single unidirectional optical communication channel). The specific modulation and demodulation process is low-speed signal modulation and demodulation as shown as performed by a combination of modulating circuit 1100 and demodulating circuit 1200.

A driving current of laser diode 1114 may be divided into modulation current and bias current. Modulating circuit 1100, the modulation of the high-speed signal (i.e., NRZ electrical signal 1118)) uses modulation current while the modulation of low-speed signal 1104 uses a bias current of laser diode 1114. In modulating circuit 1100, low-speed signal 1104 passes through buffer 1108, and laser bias current control 1112 modulates the laser bias current. The modulation result is shown in in the output eye diagram (i.e., optical NRZ signal 1122). The change of low-speed signal 1104 leads to a change of the average optical power of the output optical signal (i.e., optical NRZ signal 1122). The average optical power is used to detect and demodulate low-speed signal 1104 when receiving (i.e., by demodulating circuit 1200).

Figure 13:
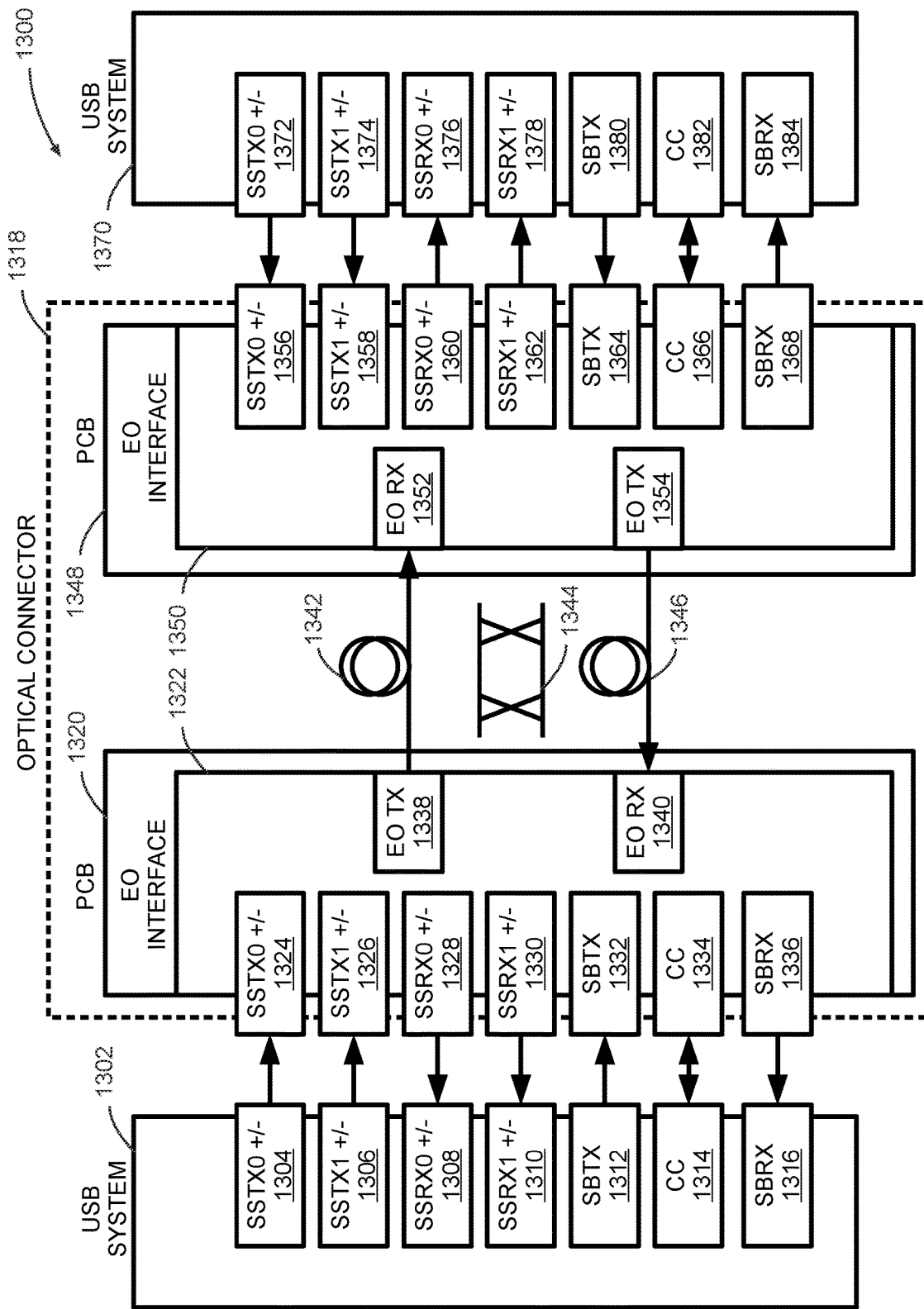
FIG. 13 is a block diagram depicting an embodiment of a USB optical connection interface.

FIG. 13 is a block diagram depicting an embodiment of a USB optical connection interface 1300. As depicted, USB optical connection interface 1300 includes USB system 1302, optical connector 1318, and USB system 1370. USB system 1302 further includes SSTX0+/− terminal 1304, SSTX1+/− terminal 1306, SSRX0+/− terminal 1308, SSRX1+/− terminal 1310, SBTX terminal 1312, CC terminal 1314, and SBRX terminal 1316. USB system 1370 further includes SSTX0+/− terminal 1372, SSTX1+/− terminal 1374, SSRX0+/− terminal 1376, SSRX1+/− terminal 1378, SBTX terminal 1380, CC terminal 1382, and SBRX terminal 1384. Optical connector 1318 further includes two printed circuit boards—PCB 1320 and PCB 1348. PCB 1320 further includes EO (electro-optical) interface 1322. PCB 1348 further includes EO interface (electro-optical) 1350. EO interface 1322 further includes SSTX0+/− terminal 1324, SSTX1+/− terminal 1326, SSRX0+/− terminal 1328 SSRX1+/− terminal 1330, SBTX terminal 1332, CC terminal 1334, SBRX terminal 1336, EO TX 1338, and EO RX 1340. EO interface 1350 further includes SSTX0+/− terminal 1356, SSTX1+/− terminal 1358, SSRX0+/− terminal 1360, SSRX1+/− terminal 1362, SBTX terminal 1364, CC terminal 1366, SBRX terminal 1368, EO TX 1352, and EO RX 1354. EO TX 1338 may be configured to transmit one or more optical signals to EO RX 1352 via a unidirectional optical communication channel 1342. EO TX 1354 may be configured to transmit one or more optical signals to EO RX 1340 via a unidirectional optical communication channel 1346. Each of unidirectional communication channel 1342 and 1346 may be implemented using one or more optical fibers.

In one aspect, each of EO interface 1322 and 1350 functions similar to electro-optical interface 500. Each of EO TX 1338 and EO TX 1354 may be similar to TX circuit 532. Each of EO RX 1340 and EO RX 1352 may be similar to RX circuit 534.

Optical connector 1318 optically interconnects USB system 1302 with USB system 1370. In one aspect, USB system 1302 is similar to USB system 102. USB system 1370 may be similar to USB system 108. In one aspect, the connectivity between USB system 1302 and EO interface 1322, using terminals SSTX0+/− 1304 through SBRX 1316 connected to terminals SSTX0+/− 1324 through SBRX 1336, is similar to the connectivity between USB system 102 and electro-optical interface 104. In one aspect, the connectivity between USB system 1370 and EO interface 1322, using terminals SSTX0+/− 1372 through SBRX 1384 connected to terminals SSTX0+/− 1356 through SBRX 1368, is similar to the connectivity between USB system 108 and electro-optical interface 104.

In one aspect, EO interface 1322 is integrated onto PCB 1320, and EO interface 1350 is integrated onto PCB 1348. Essentially, optical connector 1318 may be an alternative embodiment of optical connector 122, with each of electro-optical interface 104 and electro-optical interface 106 integrated onto a separate PCB. In one aspect, each of EO interface 1350 and 1348 is integrated onto a single integrated circuit (IC or "chip"). Functionally, optical connector 1318 provides an optical USB or Thunderbolt interface between USB system 1302 and USB system 1370. As depicted, optical connector 1318 uses an NRZ optical signal 1344 to communicate along each of unidirectional optical communication channels 1342 and 1346, with each unidirectional optical communication channel supporting a separate NRZ optical signal.

In one aspect, optical connector 1318 is a two-optical-fiber USB/thunderbolt active optical cable connected a with USB single-channel device at each end (i.e., USB system 1302 and USB system 1370). In one aspect, each of EO interface 1322 and 1350 is implemented as a distinct integrated circuit. The respective integrated circuits are bonded onto PCB 1320 and PCB 1348, respectively. Each of EO TX 1338 and EO RX 1340 may be integrated onto PCB 1320, as a laser and photodiode, respectively. In one aspect, each of EO TX 1338 and EO RX 1340 are covered with optically-transparent lenses. Each of EO TX 1354 and EO RX 1352 may be integrated onto PCB 1348, as a laser and photodiode, respectively. In one aspect, each of EO TX 1354 and EO RX 1352 are covered with optically-transparent lenses.

In one aspect, a USB system interface end of each of PCB 1320 and PCB 1348 is assembled into a distinct USB connector. The optical interface end of each of PCB 1320 and PCB 1348 may be interconnected by one or more optical fibers to realize an active optical cable (i.e., optical connector 1318) that is compatible with the USB/Thunderbolt protocol.

When the devices at both terminals of optical connector 1318 (i.e., USB system 1302 and USB system 1370) are USB3 or USB4 single-channel devices, optical connector 1318 uses NRZ signals (e.g., NRZ optical signal 1344) for communication. In this mode some circuits in optical connector 1318 enter power-down mode to save power consumption in a manner similar to the circuits described for electro-optical interface 400, modulating circuit 600, and demodulating circuit 700. Optical connector 1318 may use two optical fibers (e.g., unidirectional optical communication channels 1342 and 1346) to realize the communication between two terminals of five electrical signals, such as SSTX0+/−, SSRX0+/−, SBTX, SBRX and CC. Optical connector 1318 may be designed to have low design complexity, low cost, low power consumption, long transmission distance, good signal quality and good electromagnetic compatibility.

Figure 14:
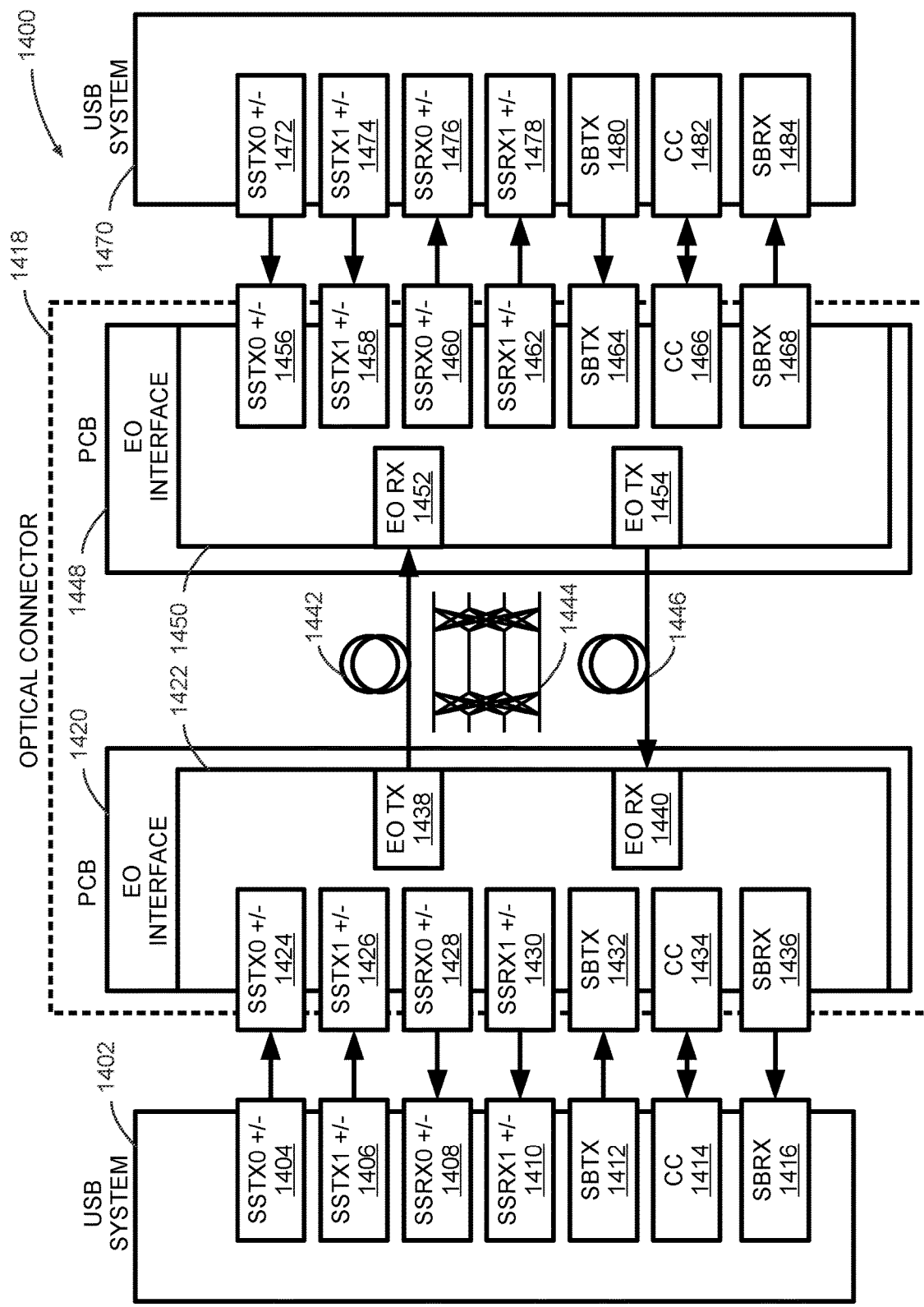
FIG. 14 is a block diagram depicting an embodiment of a USB optical connection interface.

FIG. 14 is a block diagram depicting an embodiment of a USB optical connection interface 1400. As depicted, USB optical connection interface 1400 includes USB system 1402, optical connector 1418, and USB system 1470. USB system 1402 further includes SSTX0+/− terminal 1404, SSTX1+/− terminal 1406, SSRX0+/− terminal 1408 SSRX1+/− terminal 1410, SBTX terminal 1412, CC terminal 1414, and SBRX terminal 1416. USB system 1470 further includes SSTX0+/− terminal 1472, SSTX1+/− terminal 1474, SSRX0+/− terminal 1476 SSRX1+/− terminal 1478, SBTX terminal 1480, CC terminal 1482, and SBRX terminal 1484. Optical connector 1418 further includes two printed circuit boards—PCB 1420 and PCB 1448. PCB 1420 further includes EO (electro-optical) interface 1422. PCB 1448 further includes EO interface (electro-optical) 1450. EO interface 1422 further includes SSTX0+/− terminal 1424, SSTX1+/− terminal 1426, SSRX0+/− terminal 1428 SSRX1+/− terminal 1430, SBTX terminal 1432, CC terminal 1434, SBRX terminal 1436, EO TX 1438, and EO RX 1440. EO interface 1450 further includes SSTX0+/− terminal 1456, SSTX1+/− terminal 1458, SSRX0+/− terminal 1460 SSRX1+/− terminal 1462, SBTX terminal 1464, CC terminal 1466, and SBRX terminal 1468, EO TX 1452, and EO RX 1454. EO TX 1438 may be configured to transmit one or more optical signals to EO RX 1452 via a unidirectional optical communication channel 1442. EO TX 1454 may be configured to transmit one or more optical signals to EO RX 1440 via a unidirectional optical communication channel 1446. Each of unidirectional communication channel 1442 and 1446 may be implemented using one or more optical fibers.

In one aspect, each of EO interface 1422 and 1450 functions similar to electro-optical interface 500. Each of EO TX 1438 and EO TX 1454 may be similar to TX circuit 532. Each of EO RX 1440 and EO RX 1452 may be similar to RX circuit 534.

Optical connector 1418 optically interconnects USB system 1402 with USB system 1470. In one aspect, USB system 1402 is similar to USB system 102. USB system 1470 may be similar to USB system 108. In one aspect, the connectivity between USB system 1402 and EO interface 1422, using terminals SSTX0+/− 1404 through SBRX 1416 connected to terminals SSTX0+/− 1424 through SBRX 1436, is similar to the connectivity between USB system 102 and electro-optical interface 104. In one aspect, the connectivity between USB system 1470 and EO interface 1422, using terminals SSTX0+/− 1472 through SBRX 1484 connected to terminals SSTX0+/− 1456 through SBRX 1468, is similar to the connectivity between USB system 108 and electro-optical interface 104.

In one aspect, EO interface 1422 is integrated onto PCB 1420, and EO interface 1450 is integrated onto PCB 1448. Essentially, optical connector 1418 may be an alternative embodiment of optical connector 122, with each of electro-optical interface 104 and electro-optical interface 106 integrated onto a separate PCB. In one aspect, each of EO interface 1450 and 1448 is integrated onto a single integrated circuit (IC or "chip"). Functionally, optical connector 1418 provides an optical USB or Thunderbolt interface between USB system 1402 and USB system 1470. As depicted, optical connector 1418 uses a 4-level pulse-amplitude modulated (PAM4) optical signal 1444 to communicate along each of unidirectional optical communication channels 1442 and 1446, with each unidirectional optical communication channel supporting a separate PAM4 optical signal.

In one aspect, optical connector 1418 is a two-optical-fiber USB/thunderbolt active optical cable connected a with USB single-channel device at each end (i.e., USB system 1402 and USB system 1470). In one aspect, each of EO interface 1422 and 1450 is implemented as a distinct integrated circuit. The respective integrated circuits are bonded onto PCB 1420 and PCB 1448, respectively. Each of EO TX 1438 and EO RX 1440 may be integrated onto PCB 1420, as a laser and photodiode, respectively. In one aspect, each of EO TX 1438 and EO RX 1440 are covered with optically-transparent lenses. Each of EO TX 1454 and EO RX 1452 may be integrated onto PCB 1448, as a laser and photodiode, respectively. In one aspect, each of EO TX 1454 and EO RX 1452 are covered with optically-transparent lenses.

In one aspect, a USB system interface end of each of PCB 1420 and PCB 1448 is assembled into a distinct USB connector. The optical interface end of each of PCB 1420 and PCB 1448 may be interconnected by one or more optical fibers to realize an active optical cable (i.e., optical connector 1418) that is compatible with the USB/Thunderbolt protocol.

When the devices at both terminals of optical connector 1418 (i.e., USB system 1402 and USB system 1470) are USB3 or USB4 single-channel devices, optical connector 1418 uses PAM4 signals (e.g., PAM4 optical signal 1444) for communication. Optical connector 1418 may use two optical fibers (e.g., unidirectional optical communication channels 1442 and 1446) to realize the communication between two terminals of seven electrical signals, such as SSTX0+/−, SSRX0+/−, SSTX1+/−, SSRX1+/−, SBTX, SBRX and CC. Optical connector 1418 may be designed to have low design complexity, low cost, low power consumption, long transmission distance, good signal quality and good electromagnetic compatibility.

Some features of the optical connector (i.e., active optical cable) described herein (e.g., optical connector 122, 1318 or 1418) include:

- At each port, high-speed signals SSTX0+/− and SSTX1+/− are transferred to two lasers (e.g., VCSELs) for transmission, and two receiving circuits receive the high-speed signals at an opposite terminal and output the signals to SSRX0+/− and SSRX1+/− of local terminals.
- The A-terminal interface and the B-terminal interface are configured with a transmitting terminal and a receiving terminal, wherein the transmitting terminal modulates sideband signals and channel configuration signals into the same optical path with high-speed signals for transmission through time division multiplexing and laser bias current modulation, and the receiving terminal separates low-speed signals by using an average optical power detection circuit and drives the sideband signals and channel configuration signals of opposite terminals through time division multiplexing.
- The A-terminal interface and the B-terminal interface of the active optical cable of the system are symmetrical, and the active optical cable has no directionality;
- At each port, high-speed signals SSTX0+/−, SSTX1+/− are modulated into the same laser for transmission; and in dual-channel communication, two paths of high-speed signals are modulated into PAM4 signals, while in single-channel communication, high-speed signals are transmitted by NRZ coding, the receiving terminal selects PAM4 demodulation or NRZ demodulation according to channel configuration and then outputs the signals to SSRX0+/−, SSRX1+/− of local terminals.
- A monitoring unit filters out high-speed signals through a filter to obtain LFPS signals, and the filtered signals are subjected to envelope length detection and idle time detection to obtain burst time and repeat time of LFPS signals, and LFPS instructions are obtained by using burst time and repeat time look-up tables;
- Simultaneously, LFPS signals at both terminals are monitored to judge a negotiation result of devices at both sides; when there is only Polling signals at one terminal instead of SCD1 and SCD2 signals during LFPS negotiation, it means that the device is a USB3.0 device and only supports single channel mode;
- If both communication parties (e.g., USB system 102 and USB system 108) use SCD1 and SCD2 signals for negotiation, it means that the device is a USB3.1 or USB3.2 device, and LBPM signals are further analyzed; if LBPM signals only contains rate information but do not contain channel configuration information, the device is USB3.1 device, and communication is in single channel mode;
- If LFPS-based PWM message (LBPM, where PWM stands for "Pulse Width Modulation") information contains channel configuration information, it is judged according to the negotiation of channel configuration information at both terminals, and the configuration of the party with a low channel number in the negotiation is taken as the channel configuration;

When a USB device (e.g., USB system 102 or 108) is a USB4 device, there is no LFPS signal in a high-speed channel; when a USB3 adapter exists in USB4, LFPS signals are converted into a special packet for transmission, and the channel configuration negotiation of USB4 is mainly conducted through sideband communication.

The monitoring unit simultaneously monitors sideband signals of the transmitting terminal and the receiving terminal to judge the negotiation result of channel configuration between the two terminals, The signals of SBTX and SBRX are amplified, and a sideband signal packet is analyzed to obtain the analysis of sideband communication. The monitoring unit extracts read-write information of channel configuration related registers in the sideband signal packet, and obtains a channel configuration negotiation result, with the lowest channel number in both terminals of communication as a channel negotiation result;

When the device is plugged in, the sideband signals are detected first, and if there are sideband signals, a monitoring decision for sideband signal negotiation is configured as single-channel or dual-channel;

If there is no sideband signal, LFPS negotiation monitoring is performed;

If there are data errors and other abnormalities in the monitoring process, the process returns to an initialization state for re-monitoring.

In one aspect, optical connector 122 provides two specific transmission modes: four-optical-fiber transmission of USB protocol and thunderbolt protocol signals, and two-optical-fiber transmission of USB protocol and thunderbolt protocol signals. In both transmission modes, the channel configuration results of a USB device connected to both terminals are obtained by monitoring LFPS signals and sideband signals, and the operation is adaptively selected to be single-channel mode or dual-channel mode. In dual-channel mode, all modules work, while in single-channel mode, some modules are automatically turned off for low-power operation.

On the basis of the idea of optical fiber transmission of USB protocol and Thunderbolt protocol signals, optical connector 122 implements a method of compressing out-of-band signals, channel configuration signals (CC) and high-speed signals into the same optical fiber for transmission. Optical connector also implements a transmission method of adaptive switching channel configuration (idle channel with low power consumption) or adaptive switching channel modulation and demodulation coding, by monitoring LFPS signals (low frequency periodic signals) or out-of-band signals when working in two-channel sideband single-channel mode. With low design and manufacturing complexity, high integration, low power consumption and low cost, the system provided by the application realizes optical fiber transmission compatible with USB3, USB4 and thunderbolt protocols.

Figure 15:
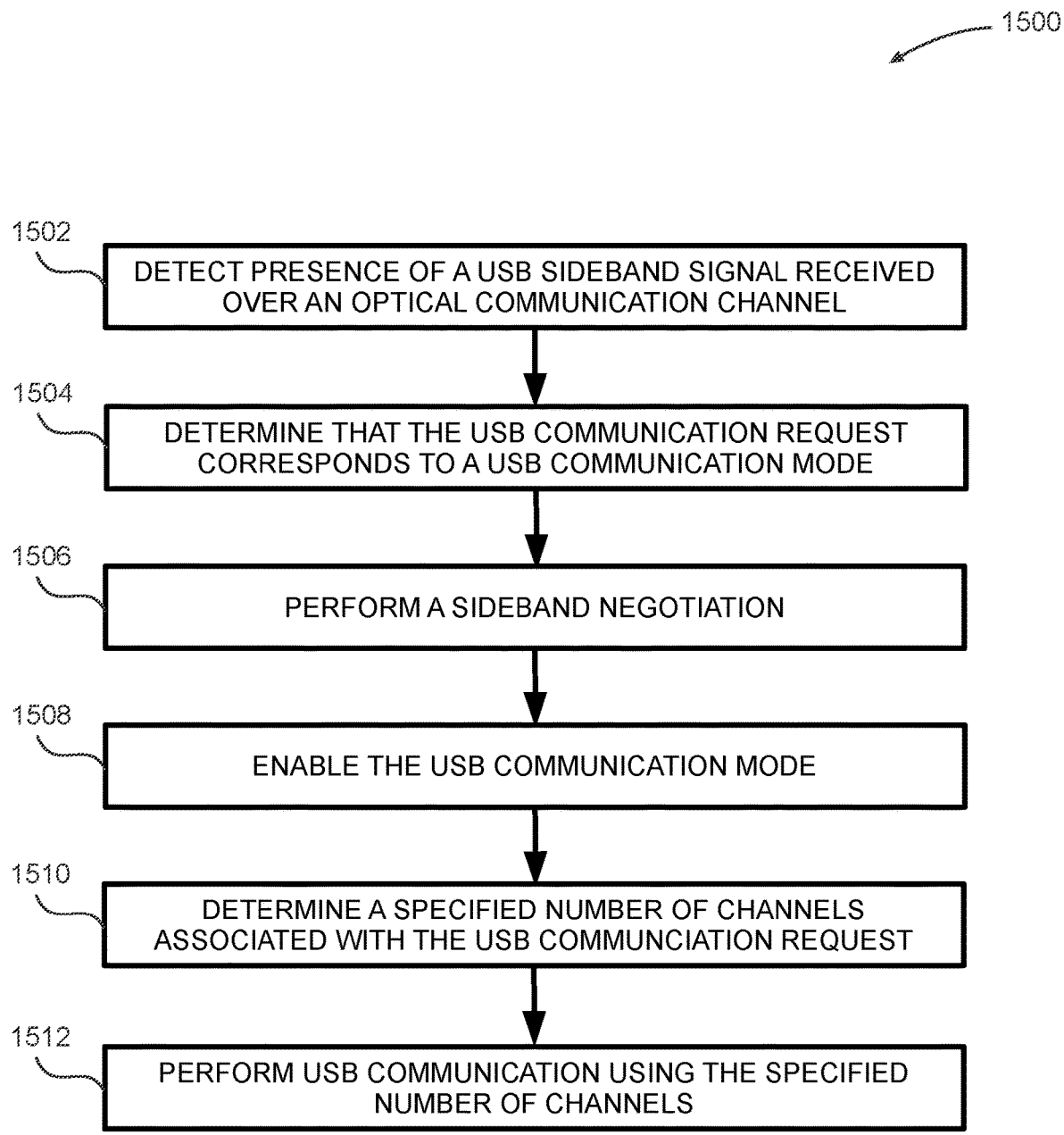
FIG. 15 is an example flow diagram depicting a method to perform USB communication.

FIG. 15 is an example flow diagram depicting a method 1500 to perform USB communication. Method 1500 may include detecting a presence of a USB sideband signal over an optical communication link (1502). For example, sideband signal monitoring unit 900 may detect a presence of a USB sideband signal received over unidirectional optical communication channel(s) 448 and/or 450. 1502 may correspond to state 1004 of state flow 1000.

Method 1500 may include determining that the USB communication request corresponds to a USB communication mode (1504). For example, sideband signal monitoring unit 900 may determine that the USB communication request corresponds to a USB communication mode. In one aspect, the USB communication mode is a USB4 communication mode.

Method 1500 may include performing a sideband negotiation (1506). For example, sideband signal monitoring unit 900 may perform a sideband negotiation. 1506 may correspond to state 1006 of state flow 1000.

Method 1500 may include enabling the USB communication mode (1508). In one aspect, the USB communication mode is a USB4 communication mode that may be enabled by sideband signal monitoring unit 900. Sideband signal monitoring unit 900 may also analyze USB sideband signals to determine whether USB communication is being performed in a USB3 mode or a USB4/Thunderbolt mode, and enable the appropriate USB communication mode.

Method 1500 may include determining a specified number of channels associated with the USB communication request (1510). For example, sideband signal monitoring unit 900 may determine whether the USB communication request pertains to single-channel communication or dual-channel communication.

Method 1500 may include performing USB communication using the specified number of channels (1512). For example, USB communication may be performed by electro-optical interface 500 in a dual-channel configuration (state 1012), or in a single-channel configuration (state 1014).

Figure 16:
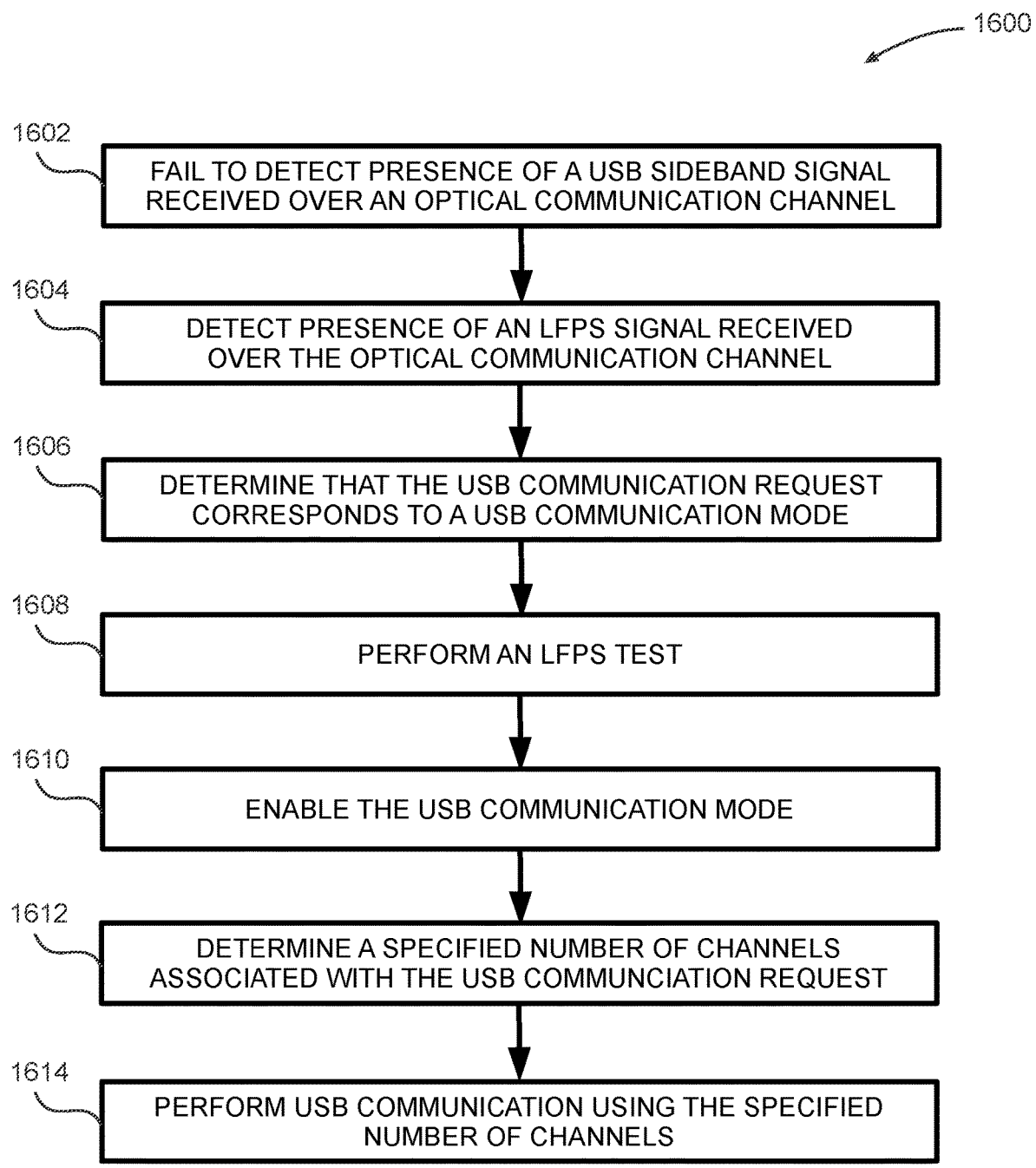
FIG. 16 is an example flow diagram depicting a method to perform USB communication.

FIG. 16 is an example flow diagram depicting a method 1600 to perform USB communication. Method 1600 may include failing to detect a presence of a USB sideband signal received over an optical communication channel (1602). For example, sideband signal monitoring unit 900 may fail to detect a presence of a USB sideband signal received over unidirectional optical communication channel(s) 448 and/or 450. 1602 may correspond to state 1004 of state flow 1000.

Method 1600 may include detecting a presence of an LFPS signal received over the optical communication channel (1604). For example, LFPS signal monitoring unit 800 may detect a presence of an LFPS signal in a received USB signal.

Method 1600 may include determining that the USB communication request corresponds to a USB communication mode (1606). For example, LFPS signal monitoring unit 800 may determine that the USB communication request corresponds to a specific USB communication mode. In one aspect, the USB communication mode is a USB3 or other USB legacy protocol communication mode.

Method 1600 may include performing an LFPS test (1608). For example, LFPS signal monitoring unit 800 may test an existence of one or more LFPS signals in the USB communication signals. This enables monitoring unit 800 to distinguish between an LFPS signal and a high-speed USB communication signal. 1606 and 1608 may correspond to state 1008.

Method 1600 may include enabling the USB communication mode (1610). In one aspect, the USB communication mode is a USB3 or other legacy USB communication mode that may be enabled by LFPS signal monitoring unit 800. Sideband signal monitoring unit 900 may also analyze USB sideband signals to determine whether USB communication is being performed in a USB3 mode or a USB4/Thunderbolt mode, and enable the appropriate USB communication mode.

Method 1600 may include determining a specified number of channels associated with the USB communication request (1612). For example, LFPS signal monitoring unit 800 may determine whether the USB communication request pertains to single-channel communication or dual-channel communication.

Method 1600 may include performing USB communication using the specified number of channels (1614). For example, USB communication may be performed by electro-optical interface 500 in a dual-channel configuration (state 1012), or in a single-channel configuration (state 1014).

In some aspects, methods 1500 and 1600 collectively implement state flow 1000.

Figure 17:
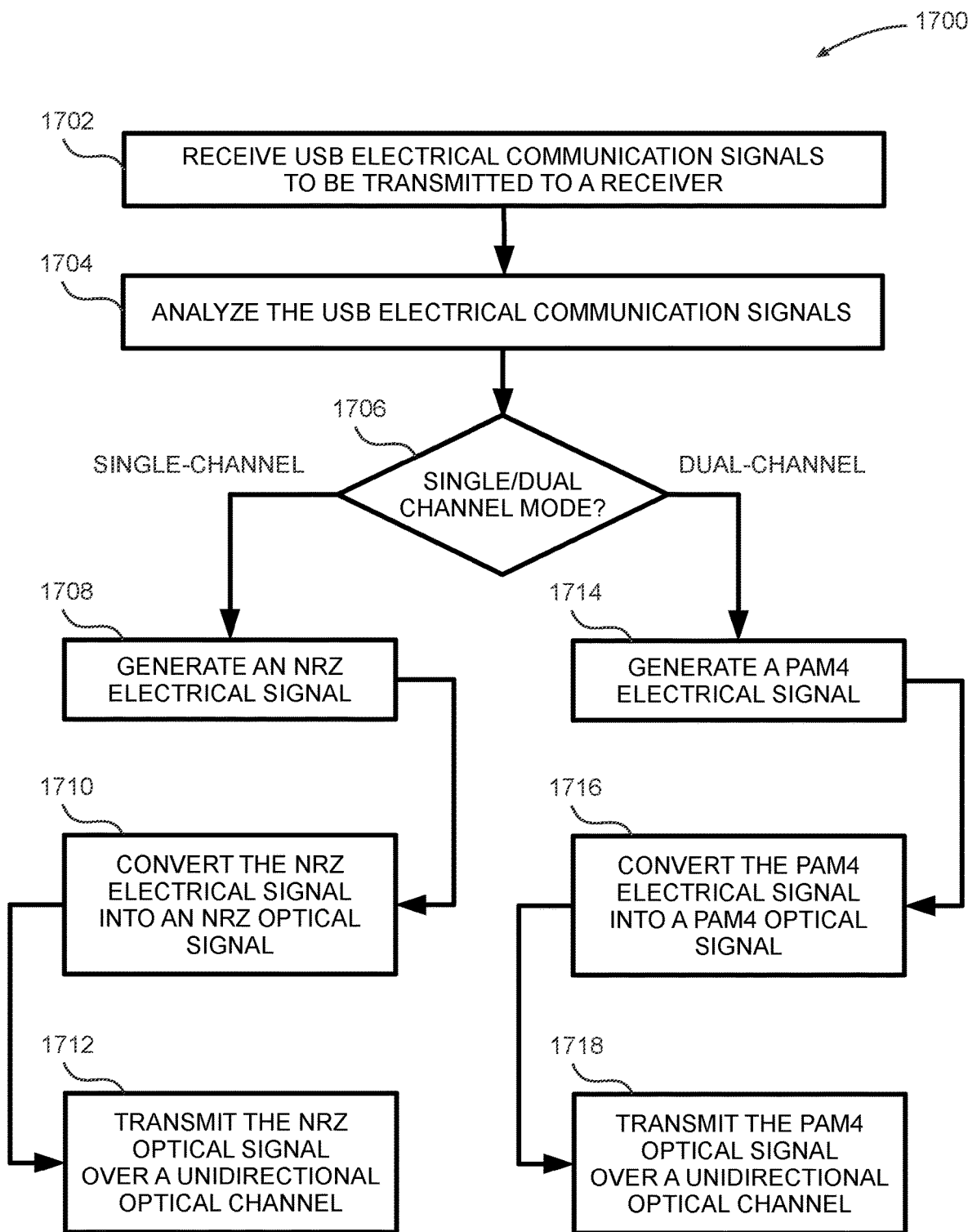
FIG. 17 is an example flow diagram depicting a method to perform USB optical communication.

FIG. 17 is an example flow diagram depicting a method 1700 to perform USB optical communication. Method 1700 may include receiving one or more USB electrical communication signal to be transmitted to a receiver (1702). For example, electro-optical interface 500 may receive a USB electrical signal (e.g., an SSTX0+/− or a combination of an SSTX0+/− and an SSTX1+/− signal, and other USB signals such as an SBTX signal, and one or more CC signals) from USB system 102 for transmission to electro-optical interface 106.

Method 1700 may include analyzing the USB electrical communication signals (1704). For example, monitoring unit 526 may analyze the USB electrical communication signals.

Method 1700 may include determining whether the USB communication signals are to be transmitted in a single-channel mode or in a dual-channel mode (1706). For example, monitoring unit 526 may determine whether the USB communication signals are to be transmitted in a single-channel mode or a dual channel mode.

If the USB communication signals are to be transmitted in a single-channel mode, then method 1700 goes to 1708, which may include generating an NRZ electrical signal corresponding to the USB electrical communication signal. For example, electro-optical interface 500 may generate an NRZ signal comprised of an SSTX0+/− signal with average power modulated by any combination of an SSTX and one or more CC signals.

Method 1700 may include converting the NRZ electrical signal into an NRZ optical signal (1710). For example, an output from laser bias current modulator 520 may be converted to an NRZ optical signal by TX circuit 532.

Method 1700 may include transmitting the NRZ optical signal to the receiver over an optical communication channel (1712). For example, TX circuit 532 may transmit the NRZ optical signal via unidirectional optical communication channel to the corresponding electro-optical interface at the other end of optical connector 122. In the single-channel mode, some components of electro-optical interface may be powered down to enable a power savings feature.

If the USB communication signals are to be transmitted in a dual-channel mode, then method 1700 goes from 1706 to 1714, which may include generating a PAM4 electrical signal corresponding to the USB electrical communication signal. For example, electro-optical interface 500 may generate a PAM4 signal comprised of an SSTX0+/− and an SSTX1+/− signal with average power modulated by any combination of an SSTX and one or more CC signals.

Method 1700 may include converting the PAM4 electrical signal into a PAM4 optical signal (1716). For example, an output from laser bias current modulator 520 may be converted to a PAM4 optical signal by TX circuit 532.

Method 1700 may include transmitting the PAM4 optical signal to the receiver over an optical communication channel (1718). For example, TX circuit 532 may transmit the PAM4 optical signal via unidirectional optical communication channel to the corresponding electro-optical interface at the other end of optical connector 122.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
   detecting presence of a USB sideband signal received over an optical communication channel and associated with a USB communication request;
   responsive to the detecting:
   determining that the USB communication request corresponds to a USB communication mode; and
   performing a sideband negotiation;
   enabling the USB communication mode;
   determining a specified number of channels associated with the USB communication request; and
   performing USB communication using the specified number of channels over the optical communication channel in the USB communication mode.

2. The method of claim 1, further comprising selecting the USB communication responsive to performing the sideband negotiation.

3. The method of claim 2, wherein determining the specified number of channels comprises determining that the USB communication is a single-channel communication or a dual-channel communication.

4. The method of claim 1, wherein failing to detect the sideband signal includes determining presence of an LFPS signal received over the optical communication channel.

5. The method of claim 1, further comprising modulating one or more low-speed USB signals onto one or more high-speed USB signals using average optical power modulation.

6. The method of claim 5, wherein the low-speed USB signals include one or more USB sideband signals and a USB CC signal.

7. The method of claim 1, wherein the optical communication channel is comprised of one or more optical fibers.

8. The method of claim 1, further comprising performing the USB communication in an NRZ mode or in a PAM4 mode.

9. A method comprising:
   checking for but failing to detect a presence of a USB sideband signal received over an optical communication channel;
   detecting a presence of an LFPS signal received over the optical communication channel and associated with a USB communication request;
   determining that the USB communication request is associated with a USB communication mode responsive the detecting;
   performing an LFPS test responsive to the detecting;
   enabling the USB communication mode;
   determining a specified number of channels associated with the USB communication request; and
   performing USB communication using the specified number of channels over the optical communication channel in the USB communication mode.

10. The method of claim 9, further comprising selecting the USB communication responsive to performing the LFPS test.

11. The method of claim 10, wherein the USB communication is a single-channel communication or a dual-channel communication.

12. The method of claim 9, further comprising performing the USB communication in an NRZ mode or in a PAM4 mode.

13. An apparatus comprising:
a first electro-optical interface electrically connected to a first USB system;
a second electro-optical interface electrically connected to a second USB system; and
an optical communication channel optically connecting the first electro-optical interface with the second electro-optical interface, wherein the first electro-optical interface is configured to:
receive an electrical USB sideband signal from the first USB system, the USB sideband signal being associated with a USB communication request;
convert the electrical USB sideband signal to an optical USB sideband signal; and
transmit the optical USB sideband signal to the second electro-optical interface, and wherein the second electro-optical interface is configured to:
detect a presence of the optical USB sideband signal received over the optical communication channel;
responsive to the detecting:
determine that the USB communication request corresponds to a USB communication mode; and
perform a sideband negotiation;
enable the USB communication mode;
determine a specified number of channels associated with the USB communication request; and
perform USB communication using the specified number of channels over the optical communication channel in the USB communication mode.

14. The apparatus of claim 13, wherein the USB communication is selected responsive to performing the sideband negotiation.

15. The apparatus of claim 13, wherein one or more low-speed USB signals are modulated onto one or more high-speed USB signals using average optical power modulation.

16. The apparatus of claim 15, wherein the low-speed USB signals include one or more USB sideband signals and a USB CC signal.

17. The apparatus of claim 13, wherein the optical communication channel is comprised of one or more optical fibers.

18. The apparatus of claim 13, further comprising one or more VCSELs configured to convert the electrical USB sideband signal to an optical USB sideband signal.

19. The apparatus of claim 13, wherein the USB communication is performed in an NRZ mode or in a PAM4 mode.

20. The apparatus of claim 13, further comprising one or photodetectors configured to convert one or more received USB electrical signals to corresponding USB optical signals.

* * * * *